United States Patent
Lind

(10) Patent No.: US 7,657,341 B2
(45) Date of Patent: Feb. 2, 2010

(54) SYSTEM, APPARATUS AND METHOD FOR FACILITATING PATTERN-BASED CLOTHING DESIGN ACTIVITIES

(75) Inventor: Kath R. E. Lind, Elgin, IL (US)

(73) Assignee: Dragon & Phoenix Software, Inc., Elgin, IL (US)

(*) Notice: Subject to any disclaimer, the term of this patent is extended or adjusted under 35 U.S.C. 154(b) by 31 days.

(21) Appl. No.: 12/140,879

(22) Filed: Jun. 17, 2008

(65) Prior Publication Data

US 2009/0222127 A1 Sep. 3, 2009

Related U.S. Application Data

(63) Continuation-in-part of application No. 11/345,068, filed on Jan. 31, 2006.

(51) Int. Cl.
G06F 19/00 (2006.01)
(52) U.S. Cl. .............................. 700/141; 700/131
(58) Field of Classification Search ......... 700/130–133, 700/141, 135; 66/232
See application file for complete search history.

(56) References Cited

U.S. PATENT DOCUMENTS

| | | | |
|---|---|---|---|
| 4,149,246 A | 4/1979 | Boldman | |
| 4,546,434 A | 10/1985 | Gioello | |
| 4,598,376 A | 7/1986 | Burton et al. | |
| 4,899,448 A | 2/1990 | Huang | |
| 4,916,624 A | 4/1990 | Collins et al. | |
| 4,916,634 A | 4/1990 | Collins et al. | |
| 4,926,344 A | 5/1990 | Collins et al. | |
| 4,949,286 A | 8/1990 | Ohba | |
| 5,163,007 A | 11/1992 | Slilaty | |
| 5,341,305 A | 8/1994 | Clarino et al. | |
| 5,495,568 A | 2/1996 | Beavin | |
| 5,680,314 A | 10/1997 | Patterson et al. | |
| 5,680,528 A | 10/1997 | Korszun | |
| 5,930,769 A | 7/1999 | Rose | |
| 6,124,858 A | 9/2000 | Ge et al. | |
| 6,307,568 B1 | 10/2001 | Rom | |
| 6,310,627 B1 | 10/2001 | Sakaguchi | |

(Continued)

FOREIGN PATENT DOCUMENTS

| | | |
|---|---|---|
| JP | 3090607 | 4/1991 |
| JP | 31556684 | 7/1991 |
| JP | 11203347 | 7/1999 |
| JP | 11286817 | 10/1999 |
| JP | 2001222568 | 8/2001 |
| JP | 2004100063 | 4/2004 |

OTHER PUBLICATIONS (Anderson). "Patternmaking Past to Present" [online], Sep. 2005 [Retrieved on Aug. 22, 2007]. Retrieved from the Internet: <http://www.techexchange.com/thelibrary/patternmaking.html>.

(Continued)

*Primary Examiner*—Danny Worrell
(74) *Attorney, Agent, or Firm*—K&L Gates LLP

(57) ABSTRACT

A system usable by a processor to enable a user to select a type of garment and view an image of the pattern for the garment. Under direction of the system, the processor enables the user to input data relating to the characteristics of an intended wearer of the garment. The processor generates knitting instructions, indications of varying degrees of pressure applied by garments to a graphical model, and printings of pattern representations of pattern providers.

20 Claims, 14 Drawing Sheets

U.S. PATENT DOCUMENTS

| | | | |
|---|---|---|---|
| 6,353,770 | B1 | 3/2002 | Ramsey et al. |
| 6,404,426 | B1 | 6/2002 | Weaver |
| 6,415,199 | B1 | 7/2002 | Liebermann |
| 6,462,740 | B1 | 10/2002 | Immel |
| 6,473,671 | B1 | 10/2002 | Yan |
| 6,516,240 | B2 | 2/2003 | Ramsey et al. |
| 6,546,309 | B1 | 4/2003 | Gazzuolo |
| 6,564,118 | B1 | 5/2003 | Swab |
| 6,700,578 | B2 | 3/2004 | Kamata et al. |
| 6,701,207 | B1 | 3/2004 | Gazzuolo |
| 6,711,455 | B1 | 3/2004 | Holloway et al. |
| 6,724,383 | B1 | 4/2004 | Herken et al. |
| 6,725,124 | B2 | 4/2004 | Yan |
| 6,882,897 | B1 | 4/2005 | Fernandez |
| 6,901,379 | B1 | 5/2005 | Balter et al. |
| 6,907,310 | B2 | 6/2005 | Gardner et al. |
| 6,968,075 | B1 | 11/2005 | Change |
| 7,079,134 | B2 | 7/2006 | Kung et al. |
| 2001/0026272 | A1 | 10/2001 | Feld et al. |
| 2002/0103566 | A1 | 8/2002 | Gadson |
| 2002/0138170 | A1 | 9/2002 | Onyshkevych et al. |
| 2003/0011590 | A1 | 1/2003 | Kung et al. |
| 2003/0074099 | A1 | 4/2003 | Yan |
| 2003/0204564 | A1 | 10/2003 | Keene |
| 2004/0049309 | A1 | 3/2004 | Gardner et al. |
| 2004/0078285 | A1 | 4/2004 | Bijvoet |
| 2004/0153195 | A1 | 8/2004 | Watanabe |
| 2004/0158345 | A1 | 8/2004 | Watanabe |
| 2004/0186611 | A1 | 9/2004 | Wang |
| 2004/0189667 | A1 | 9/2004 | Beda et al. |
| 2004/0236455 | A1 | 11/2004 | Woltman et al. |
| 2004/0236456 | A1 | 11/2004 | Pieper et al. |
| 2004/0236457 | A1 | 11/2004 | Stabelfeldt et al. |
| 2005/0131571 | A1 | 6/2005 | Costin |
| 2005/0154487 | A1 | 7/2005 | Wang |
| 2005/0283267 | A1 | 12/2005 | Bingham et al. |
| 2006/0015208 | A1 | 1/2006 | Reyes Moreno |

OTHER PUBLICATIONS

"3D Direct: The solution for rapid prototyping," written by Gerber Technology, 2005 on or before December thereof.

"About V-Stitcher, Envision True-to-Life Garment Modeling" [online] [retrieved from the Internet Jan. 30, 2006] <URL: http://www.browzwear.com/index.asp>.

"Automatic Modeling of Virtual Humans and Body Clothing" by Nadia Magnenat-Thalmann, Hyewon Seo and Frederic Crodier, prior to Jan. 31, 2006.

"Bodynits of Singapore Uses Browzwear's V-Stitcher to solve fit issues and presenting Virtual samples to its buyers," Jan. 2005 [online] [retrieved from the Internet Jan. 30, 2006] <URL: http://www.browzwear.com/news.asp>.

"BodyScanner—Body Measurement," [online] [retrieved from the Internet Jan. 30, 2006] <URL: http://www.lectra.com/en/lib/php/print.php?p_url=http://www.lectra.com/en/fashion_appar...>.

"Browzwear to launch a new on line fashion and community game—Stylezone," Dec. 1, 2005, [online] [retrieved from the Internet Jan. 30, 2006] <URL: http://www.browzwear.com/index.asp>.

"Cranky Consumer: Finding the Perfect Pair of Jeans—On the Internet," by Christina S.N. Lewis and Jessica E. Vascellaro, The Wall Street Journal Online, Jan. 19, 2006 [online] [retrieved from the Internet Jan. 20, 2006] <URL: http://online.wsj.com/article_email/article_print/SB113762924530050250-1MyQjAxMDE2MzI3...>.

"Faster prototyping," [online] [retrieved from the Internet Jan. 30, 2006] <URL: http://www.lectra.com/en/lib/php/print.php?p_url=http://www.lectra.com/en/fashion_appar...>.

"Gerber Technology: Gerber 3D Direct Your ticket to rapid prototyping," Internet Demonstration [online] [retrieved from the Internet Jan. 3, 2006] <URL: http://www.gerbertechnology.com/gtwww/flash/3D-direct/3DDirectDemo.swf>.

"Haute Couture 3D," [online] [retrieved from the Internet Jan. 30, 2006] <URL: http://www.padsystem.com/en/Software_HC3D.html>.

"Interactive Deformable Models to Create Chairs" by Aseem Agarwala, prior to Jan. 31, 2006.

"Made-to-Measure Technologies for an Online Clothing Store" by Frederic Cordier, Hyewon Seo and Nadia Magnenat-Thalmann, published by IEEE Computer Society, Jan./Feb. 2003.

"Ocean Sky Uses Browzwear's V-Stitcher to Share Design Ideas Virtually and Reduce Product Development Cycle Time," Aug. 2004 [online] [retrieved from the Internet Jan. 30, 2006] <URL: http://www.browzwear.com/news.asp>.

"Optitex Marker Making". Textile Productivity Features [online]. Optitex, Jan. 12, 2006 [retrieved on Aug. 22, 2007]/ Retrieved from the Internet: <http://webarchive.org/web/20060112164935/http://optitex.com/en/Products/Marker_Making>.

"PatternMaker Sewing projects: Women's panties," [online] [retrieved from the Internet prior to Jan. 31, 2006] <URL: http://www.leenas.com>.

"Raster and Vector Spatial Data Models," [online] [retrieved from the Internet Jan. 23, 2006] <URL: http://uwadmnweb.uwyo.edu/anthropology/faculty/GeorgeGill.htg/gis/Raster%20vs.%20Vector.htm>.

"Shapely Shadow—FastFit™ Software, The Real solution for the True Garment," [online] [retrieved from the Internet Jan. 30, 2006] <URL: http://shapelyshadow.com/_main/Index.cfm?page+api/360gv.cfm&pageTitle+Shapely%20Shadow%20>.

"Shapely Shadow—RealForms™, Fit on Skin," [online] [retrieved from the Internet Jan. 30, 2006] <URL: http://shapelyshadow.com/_main/Index.cfm?page+api/real.cfm&pageTitle+Shapely%20Shadow%20-%2...>.

"Shapely Shadow—Symmetrical Dressforms and Clones of the Elite . . . ," 2006 Shapely Shadow, Inc., [online] [retrieved from the Internet Jan. 30, 2006] <URL: http://shapelyshadow.com/_main/Index.cfm>.

"StyleZone, the Online Fashion Community" [online] [retrieved from the Internet Jan. 30, 2006] <URL: http://www.stylezone.com/cs/SZDownloadMe/SZComingSoon.aspx>.

"SyFlex—Advanced Cloth Simulation", [online] [retrieved from the Internet Jan. 30, 2006] <URL: http://www.ilumina.ca/sy.htm>.

"SyFlex—The Cloth Simulator," [online] [retrieved from the Internet Jan. 30, 2006] <URL: http://www.syflex.biz/index.html>.

"SyFlex—The Cloth Simulator," [online] [retrieved from the Internet Jan. 30, 2006] <URL: http://www.syflex.biz/features.html>.

"Vector Data Model," [online] [retrieved from the Internet Jan. 23, 2006] <URL: http://www.gis.com/implementing_gis/data/vector.html>.

"Vector graphics" [online] [retrieved from the Internet Jan. 24, 2006] <URL: http://en.wikipedia.org/wiki/Vector_graphics>.

"Virtual Clothes, Hair and Skin for Beautiful Top Models" by Nadia Magnenat Thalmann, Stephane Carion, Martin Courchesne, Pascal Volino and Yin Wu, MIRALab Copyright © Information 1998 on or before December thereof.

"Wild Ginger PatternMaster v.3," [online] [retrieved from the Internet Jan. 30, 2006] <URL: http://www.wildginger.com/products/patternmaster.htm>.

Clothing, The World Book Encyclopedia, vol. 4, 2001, on or before December thereof, p. 706.

DSC 2003 Working Papers (Draft Versions): "A Framework for an R to OpengL Interface for Interactive 3D graphics" by Daniel Adler and Oleg Nenadić, 2003 on or before December thereof.

Illustration of padsystem [online] [retrieved from the Internet Jan. 30, 2006] <URL: http://www.padsystem.com/img/sewing.gif>, http://web.archive.org/web/*/http://www.padsystem.com (18 pages total).

SYSTEM, APPARATUS AND METHOD FOR FACILITATING PATTERN-BASED CLOTHING DESIGN ACTIVITIES

PRIORITY CLAIM

This application is a continuation-in-part of, and claims priority to, U.S. patent application Ser. No. 11/345,068, filed on Jan. 31, 2006, the entire contents of which are hereby incorporated by reference.

BACKGROUND

Apparel manufacturers, home sewers and other clothing makers typically make garments based on patterns. The pattern determines the size and shape of the garment. It is common for the clothing makers to refer to a pattern book to select their patterns. Each pattern in the book corresponds to a particular type of garment and a particular range of body measurements. Knowing the wearer's garment preference and body measurements, the clothing maker can select one of the patterns.

One disadvantage with this process is that it can exclude a significant degree of a person's uniqueness. For example, some people have hour glass-shaped torsos or rectangular-shaped torsos, while others have upwardly pointing triangular-shaped torsos or downwardly pointed triangular-shaped torsos. The range-based pattern selection process can exclude these unique factors from the garment design process.

To provide a better fit, garment makers sometimes manually alter the patterns. Other times, the wearers have their garments tailored to obtain a better fit. The process of altering patterns and obtaining tailoring services can be inconvenient, time consuming and relatively expensive. Consequently, many people skip these steps and choose to wear clothes with a fit that is inadequate or is only moderately complimentary to their unique shapes and sizes.

There is a need to overcome the disadvantages described above. There is also a need to provide improvements applicable to pattern-based design activities.

SUMMARY

The pattern-based design system, in one embodiment, generally relates to a computerized system involving clothing or garment design and the production of customized patterns for the designed garment. The system can be used by clothing designers or manufacturers, including, without limitation, apparel design professionals, professional or hobby sewers, fashion designers and others involved in the clothing industry. The clothing design system can be used to design clothing for different types of wearers, including, without limitation, humans (adults and children), animals and pets, such as dogs and cats. For the case where the intended wearer is a human, the user of the system 10 can be the intended wearer.

In one embodiment, the clothing design system enables the user to: (a) select a desired garment; (b) view a pattern layout for the garment; (c) build a graphical model of the intended wearer based upon body characteristics input by the user; (d) view a simulation of the garment being worn on the graphical model; (e) make adjustments to the garment, the ease and fit of the garment or the size or shape of the graphical model; (f) automatically view an update of the pattern layout and measurement window based upon changes made in the garment or graphical model; and (g) print the pattern necessary to make the garment. This type of system provides users with enhanced convenience, efficiency and customization in designing garments and obtaining customized garment patterns.

The clothing design system has a plurality of technical effects or technical contributions. One such contribution is the reduction in data storage needs through use of vector-based graphical modeling in computerized clothing design. Another such contribution is the reduction in the amount of computer code or programming code which is necessary to generate models, where the models represent the bodies of intended wearers and the clothes they are wearing in a virtual environment. This reduction is programming code can be attributed to the use of multiple element layers in vector-based graphical modeling, as described further below.

Additional features and advantages are described herein, and will be apparent from, the following Detailed Description and the figures.

DETAILED DESCRIPTION

Figure 1:
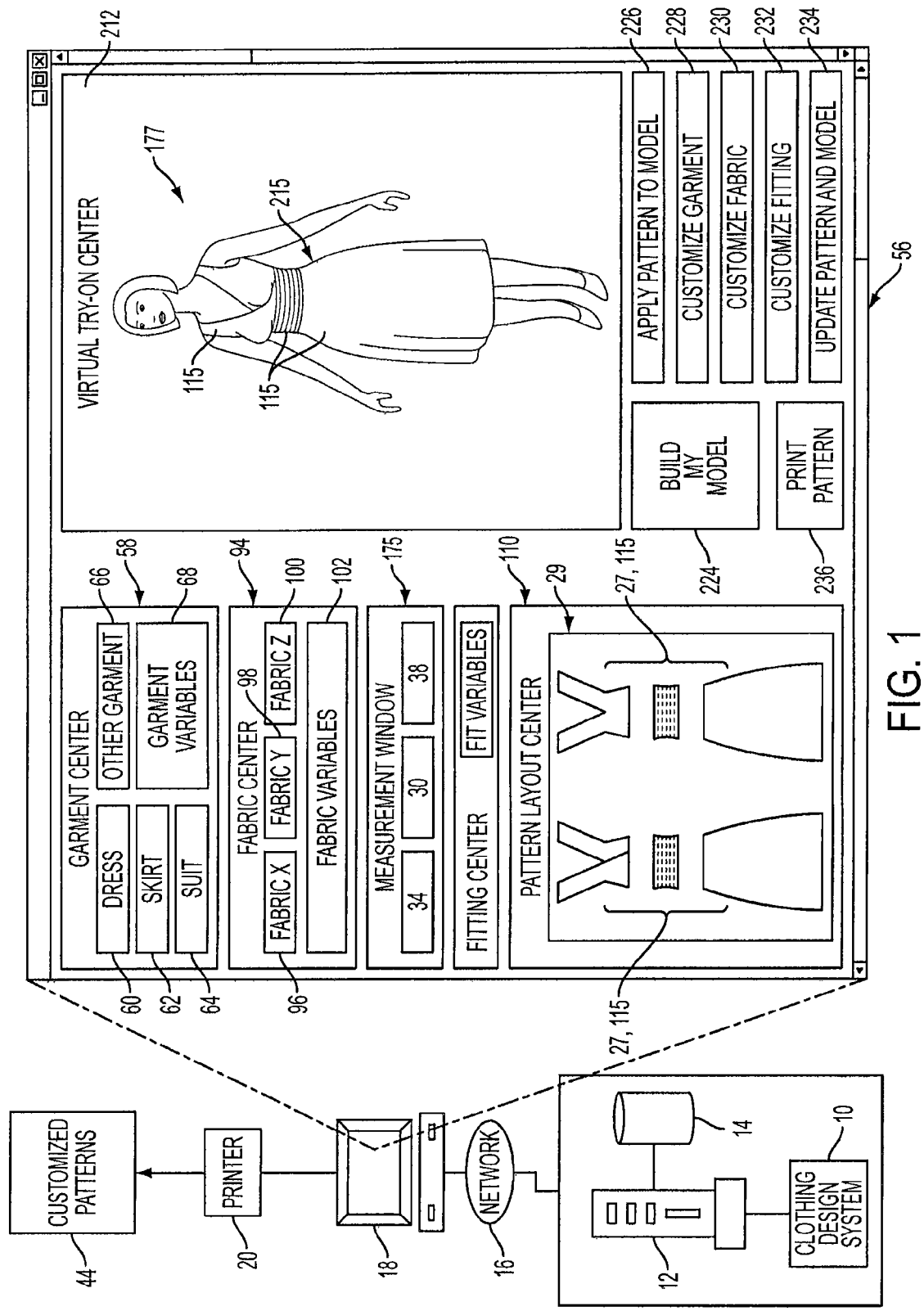
FIG. 1 is a diagrammatic view of one embodiment of the clothing design system, server, database, network, computer, printer, customized patterns and graphical user interface.

Referring now to the drawings, FIG. 1 illustrates one embodiment of the clothing design system 10. The clothing design system 10 includes a plurality of computer readable instructions which are accessible by one or more processors or servers 12. In one embodiment, the system 10 includes a plurality of programming modules which control or direct the operation of the server 12. The server 12 executes the instructions of the modules to perform particular functions. In this disclosure, the modules may, at times, be described as performing certain functions. It should be understood, however, that the server 12 actually performs the functions of such modules by executing such modules. In this regard, the modules perform (or define the performance of) certain functions.

Each module includes a set of computer-readable instructions and data which are related to a designated function, purpose, subject matter or topic. This type of modular construction of the clothing design system 10 can be created using any suitable computer programming language or database, including, without limitation, JAVA, C++ or SQL for specifying business logic and other functions. In another embodiment, the clothing design system 10 is structured as a single module or single set of computer-readable instructions. In such case, this single set of computer-readable instructions has the functionality of the clothing design system's separate modules which are described in detail below.

The server 12 is coupled to one or more data storage devices or databases 14. The database 14 stores pre-stored data which is accessed or retrieved by the server 12, including, without limitation, one or more catalogs of garment data, one or more catalogs of fabric data, theoretical model data (described below) and default fitting data. Also, the database 14 stores the data input by the user for processing and future retrieval by the user.

In addition to being coupled to the database 14, the server 12 is coupled to an electronic network or a data network 16, such as a local area network, wide area network, public network or any portion of the Internet. This enables the user to access the system 10 anywhere the network 16 is accessible. In the example illustrated, one or more network access devices 18, such as a personal computer, is coupled to the network 16. It should be appreciated that the network access device 18 can include a standard desktop computer, a standard laptop computer, a personal digital assistant, a mobile phone with data processing capabilities or any other suitable network-enabled, computerized apparatus. The network access device 18 is coupled to one or more printers 20 which are operable to print text and images on paper.

Referring to FIGS. 1 through 7, the clothing design system 10, in one embodiment, includes: (a) a garment module 22 which enables the user to select desired garment factors or parameters; (b) a fabric module 24 which enables the user to select desired fabric factors or parameters; (c) a layout module 26 which is used by server 12 to cause the computer 18 to display a two-dimensional pattern image 27 of the selected garment's pattern, and the pattern image 27 is displayed so as to overlay a two-dimensional fabric image 29 of the selected fabric; (d) a wearer characteristic input module 28 which enables the user to input a plurality of characteristics of the intended wearer of the selected garment; (e) a wearer characteristic output module 31 which causes the computer 18 to indicate to the user, the characteristic data input by the user; (f) a modeling module 30 which causes the server 12 to produce a three-dimensional graphical representation or model of the intended wearer who is trying-on the selected garment in a virtual environment; (g) a fitting module 32 which enables the user to adjust a plurality of fitting parameters or ease and fit settings while the selected garment is shorten on the graphical model of the intended wearer; (h) a coupling module 34 which operatively couples the layout module 26 to the modeling module 30 and the wearer characteristic output module 31, as described in detail below; (i) an archive module 36 which enables the user to save and store desired files, images, settings and other data, as described further below; (j) a data structure management module 38 which enables the server 12 to manage the data which is input by the user as well as the data which is pre-stored in the database 14; (k) a preference setting module 40 which enables the user to set a plurality of settings or configurable parameters used to control the function and visual output of the clothing design system 10, as described further below; and (l) a printing module 42 which enables the server 12 to cause the printer 20 to print customized patterns 44, as described further below.

Figure 3:
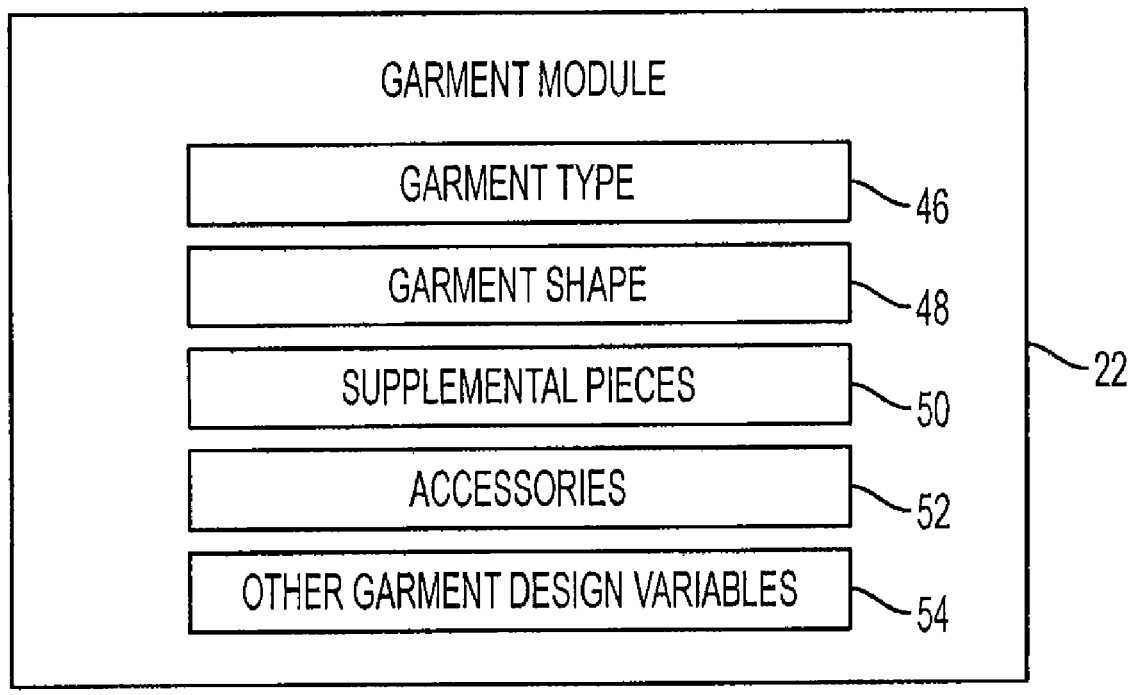
FIG. 3 a schematic block diagram illustrating the modules and functionality of the garment module of one embodiment of the clothing design system.

As best illustrated in FIG. 3, the garment module 22 enables the user to select the desired garment based upon a plurality of factors, including: (a) the garment type 46; (b) the garment shape 48; (c) supplemental pieces 50 which can be optionally added to the selected garment (i.e., pockets or bows); (d) accessories 52 which can be optionally added to, or used in conjunction with, the selected garment (i.e., florets, patches or other embellishments); (e) other suitable garment design variables 54; (f) trim 55 (i.e., lace, ribbon, fringe or beaded edging); and (g) fasteners or components 56, including, but not limited to zippers, buttons, clasps and snaps.

In the example illustrated in FIG. 1, the clothing design system 10 causes the computer 18 to display a main graphical interface or main window 56. In this example, the garment center 58, controlled by the garment module 22, enables the user to input a selection from a category, of dress 60, skirt 62, suit 64 or another type of garment 66. The garment center 58 also enables the user to select a plurality of other garment variables 68.

Figure 4:
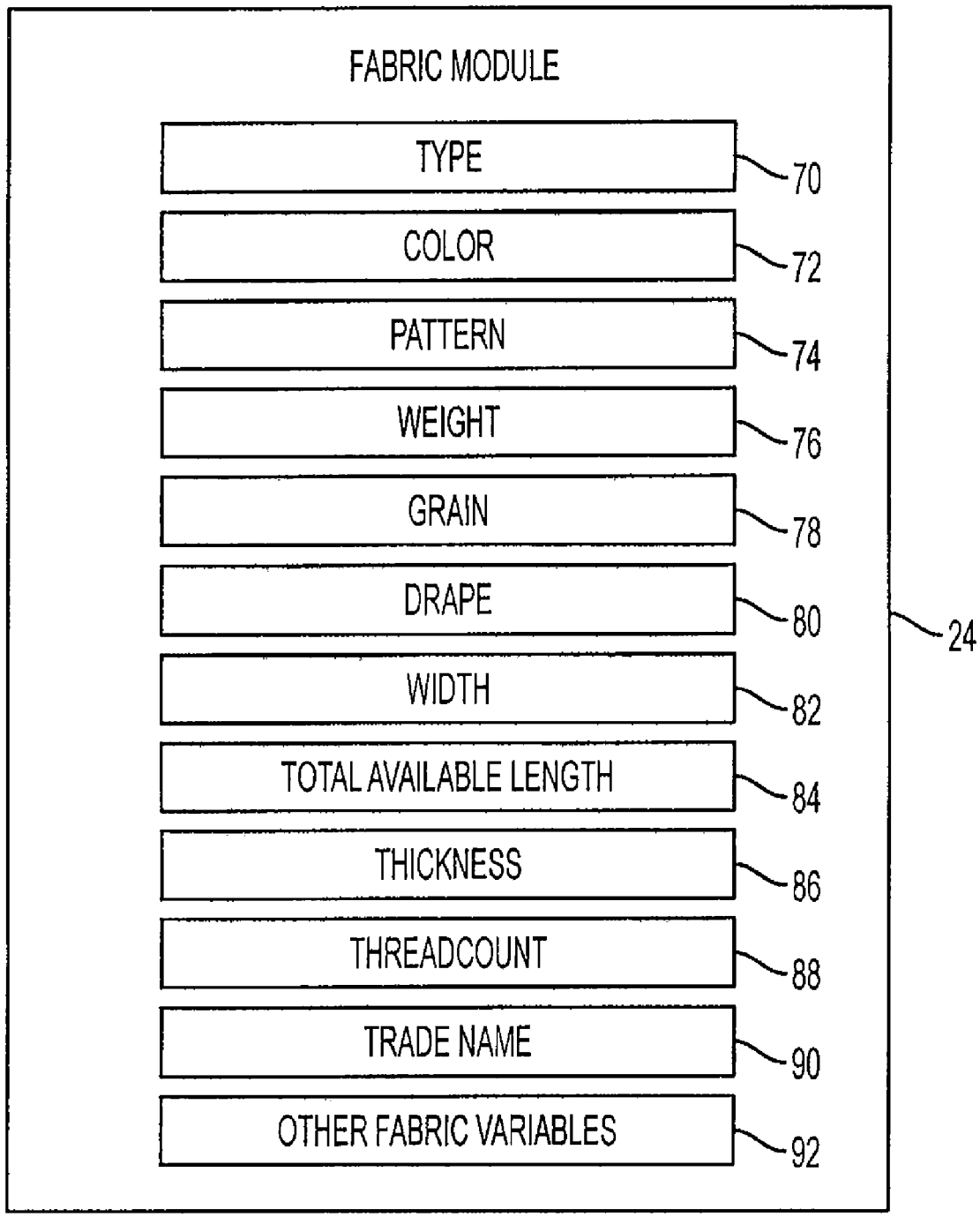
FIG. 4 a schematic block diagram illustrating the modules and functionality of the fabric module of one embodiment of the clothing design system.

Referring to FIG. 4, the fabric module 24, in one embodiment, enables the user to select the desired fabric by type 70, price or cost 71, color 72, texture 73, pattern 74, softness 75, weight 76, care instructions 77, grain 78, grade 80, width 82, total available length 84, thickness 86, thread count 88, trade name 90 and other suitable fabric variables 92. Referring back to FIG. 1, in one example, the fabric module 24 causes the server 12 to display a fabric center 94. In this example, the fabric center 94 enables the user to select fabric X 96, fabric Y 98 or fabric Z 100. The fabric center 94 also enables the user to select a plurality of additional suitable fabric variables 102.

Figure 5:
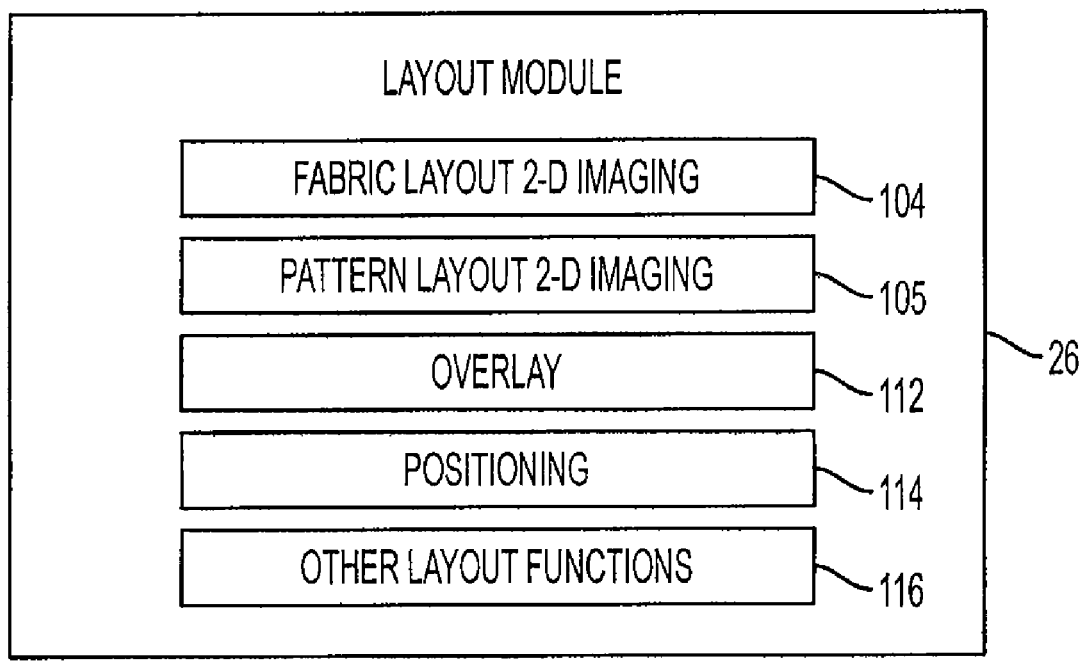
FIG. 5 a schematic block diagram illustrating the modules and functionality of the layout module of one embodiment of the clothing design system.

Referring to FIG. 5, the layout module 26, in one embodiment, includes: (a) a fabric usage optimizer module or fabric usage module 103 which enables the computer 18 to automatically select a width and length dimension for a fabric piece sized at least as large as the pattern in laid-out form, wherein the selected width and length dimensions reduces portions of the fabric piece which will be unused in constructing the garment; (b) a fabric layout 2-D imaging module 104 which enables the computer 18 to display the two-dimensional fabric image 29 as if the selected fabric were laid out on a table; (c) a pattern layout 2-D imaging module 108 which enables the computer 18 to display the two-dimensional pattern image 27 within the pattern layout center 110; (d) an overlay module 112 which is used by the server 12 to cause the computer 18 to visually lay the pattern image 27 on top of the fabric image 29; (e) a positioning module 114 which enables the server 12 to cause the pattern image 27 to be positioned or repositioned relative to the fabric image 29 based upon an automatic positioning process or based upon inputs made by the user; and (f) a plurality of other suitable layout functions 116 which cause the computer 18 to provide suitable visual outputs within the layout center 110 based upon an automatic process or inputs made by the user.

In one alternative embodiment, the fabric layout module 104 can, in one embodiment, display the fabric image 29 in a three-dimensional form. For example, an edge of the fabric can be illustrated with an edge image to illustrate the thickness of the fabric. It should be understood that the pattern layout module 104 can graphically represent the pattern corresponding to the selected garment by displaying a black or colored line, in solid or dotted form, which outlines the shape of such pattern. Alternatively, the pattern layout module 104 can display the pattern as a solid or filled-in image, in two-dimensional or three-dimensional form. In the example illustrated in FIG. 1, the selected garment is a ruched-waist dress which includes an assembly of six garment pieces displayed as six garment piece images 115. Accordingly, the pattern image 27 specifies the shape of this garment with a solid line outlining the six garment pieces.

Figure 6:
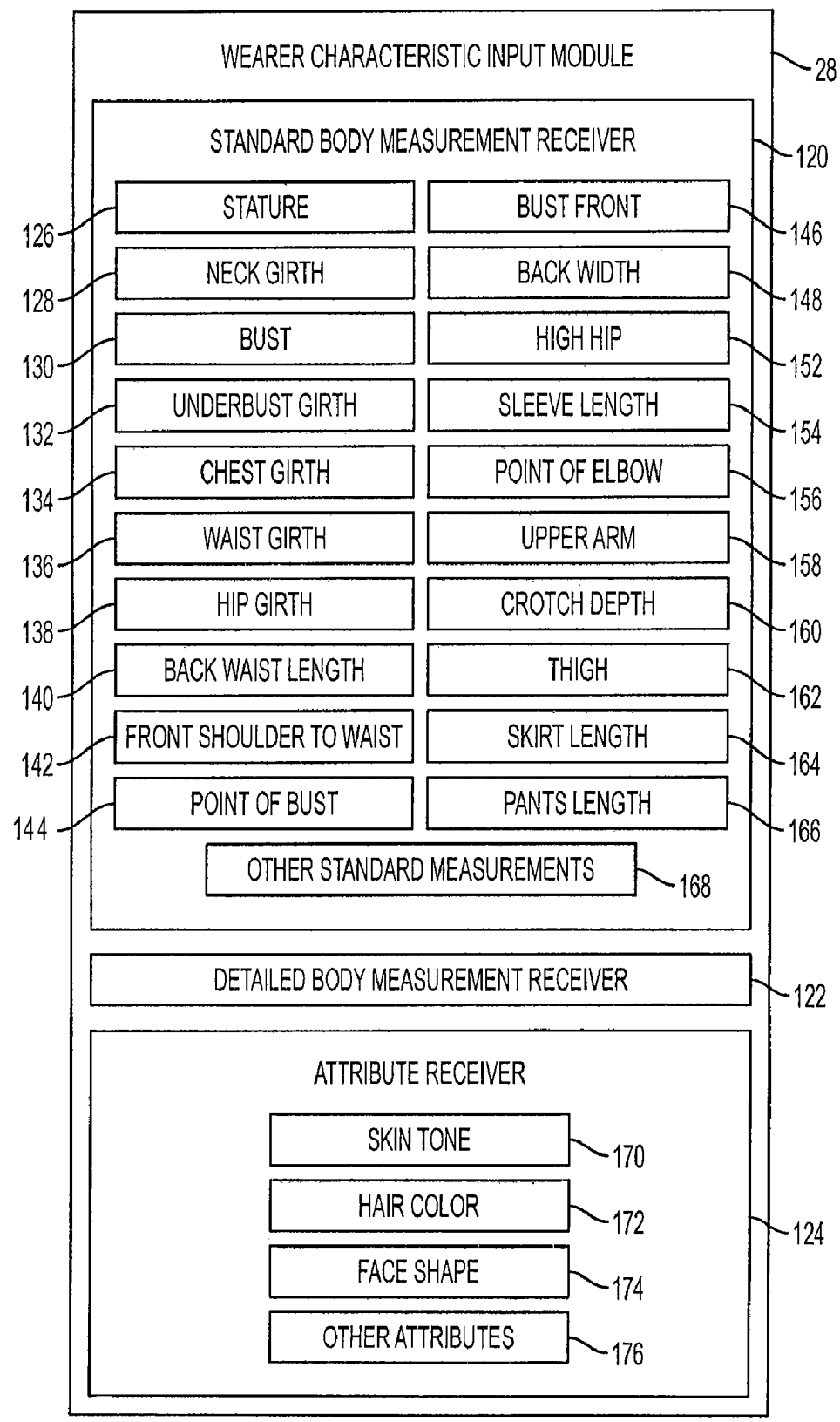
FIG. 6 a schematic block diagram illustrating the modules and functionality of the wearer characteristic input module of one embodiment of the clothing design system.

Referring now to FIG. 6, the wearer characteristic input module 28, in one embodiment, includes: (a) a standard body measurement receiver 120 which enables the user to input a plurality of body measurements relating to the intended wearer; (b) a detailed body measurement receiver 122 which enables the user to input a plurality of body measurements, beyond what might be considered to be industry standard measurements; and (c) an attribute receiver 124 which enables the user to input a plurality of attributes of the intended wearer, where the attributes are not necessarily measurable by dimensions. The wearer characteristic input module 28 enables the user to enter or input the data through use of a keyboard, touch screen, microphone or other suitable input device.

The measurements receivable by the standard body measurement receiver 120 can be determined by any suitable industry standard, including, without limitation, the standards set by ASTM International, a standards development organization originally known as the American Society for Testing and Materials. In the example illustrated in FIG. 6, the standard body measurement receiver 120 enables the user to input the following measurements of the intended wearer: stature 126, neck girth 128, bust 130, under bust girth 132, chest girth 134, waist girth 136, hip girth 138, back waist length 140, front shoulder to waist 142, point of bust 144, bust front 146, back width 148, high hip 150, sleeve length 152, point of elbow 156, upper arm 158, crotch depth 160, thigh 162, skirt length 164, pants length 166 and other suitable standard measurements 168.

The detailed body measurement receiver 122 enables the user to input measurements of the intended wearer which specify or describe the wearer's size or shape at points of the body which lie between the measurement points of the standard body measurement receiver 120. For example, the detailed body measurement receiver 122 may enable the user to input the user's torso circumference at a height of seven inches above the crotch, at another height of seven and one-half inches above the crotch, at another height of eight inches above the crotch, at another height of eight and one-half inches above the crotch, and at another height of nine inches above the crotch. The detailed body measurement receiver 122 can enable the user to input these types of measurements for the user's entire torso, legs, arms, neck and entire body. As described further below, the system 10 uses this detailed input data to generate a relatively detailed map or model of the topology of the intended wearer's body.

With continued reference to FIG. 6, the attribute receiver 124 enables the user to input the attributes of the intended wearer which may or may not be measurable in terms of dimensions or magnitude. For example, the attribute receiver 124 can enable the user to input data corresponding to the intended wearer's skin tone 170, hair color 172, general face shape 174 and other suitable attributes 176.

Figure 10:
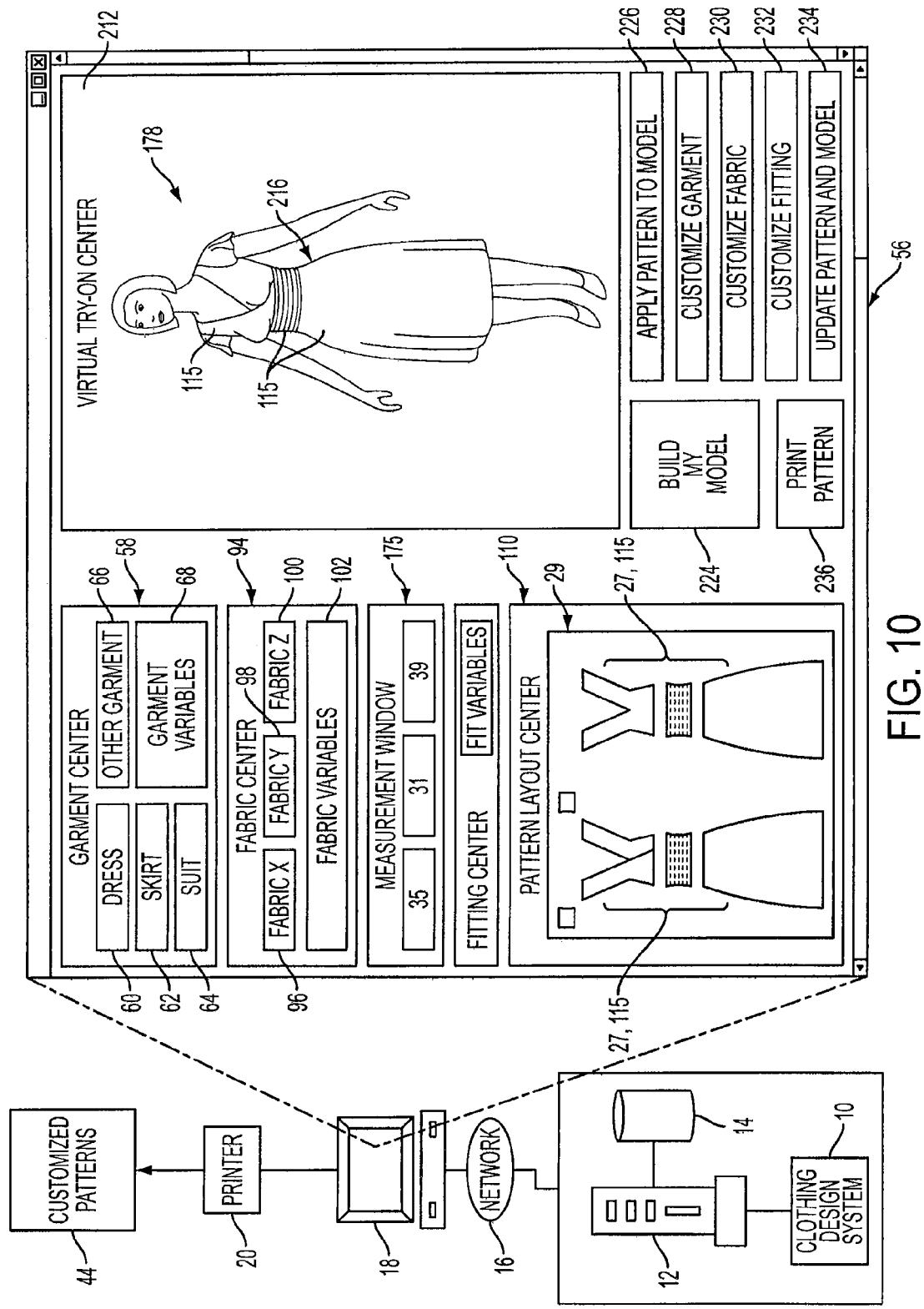
FIG. 10 is a top plan view of a graphical user interface of one embodiment of the clothing design system, illustrating an example in which the pattern layout and measurement window is automatically updated when the user: (a) adds shoulder garment pieces to the garment worn on the generated model; and (b) changes certain measurements associated with the intended wearer.

After the server 12 receives the wearer's data input through the wearer characteristic input module 28, the wearer characteristic output module 29 enables this data to be viewed by the user. The wearer characteristic output module 29, in one embodiment, causes the computer 18 to display a measurement window, image or characteristic window 175, as illustrated in FIGS. 1 and 10. The characteristic window 175 displays or graphically indicates the measurements and other characteristic data which is input by the user. In one embodiment, the characteristic window 175 displays the inches or centimeters of the girths, widths, lengths and other measurements received by the wearer characteristic input module 28.

Figure 7:
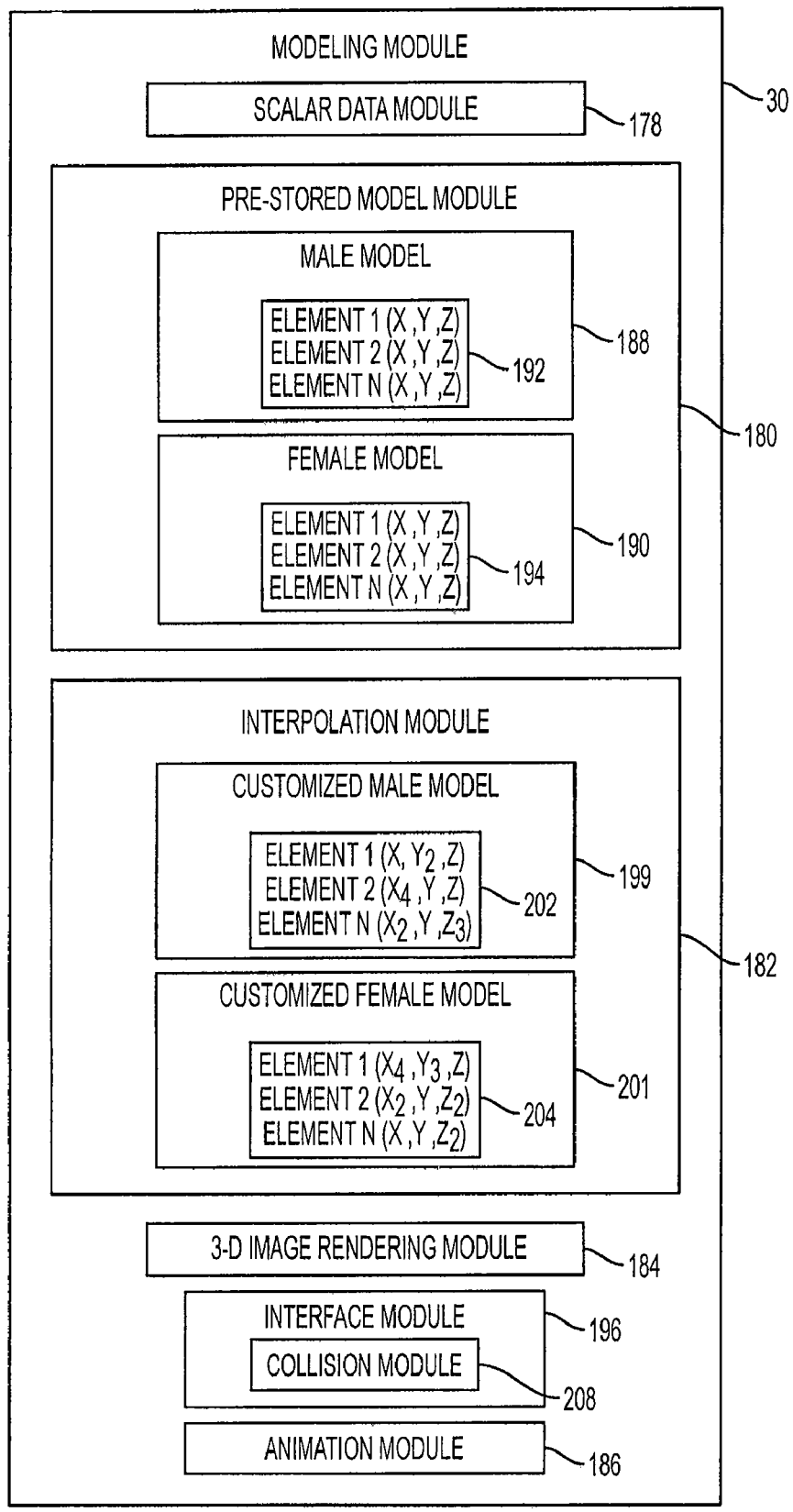
FIG. 7 a schematic block diagram illustrating the modules and functionality of the modeling module of one embodiment of the clothing design system.
Figure 8:
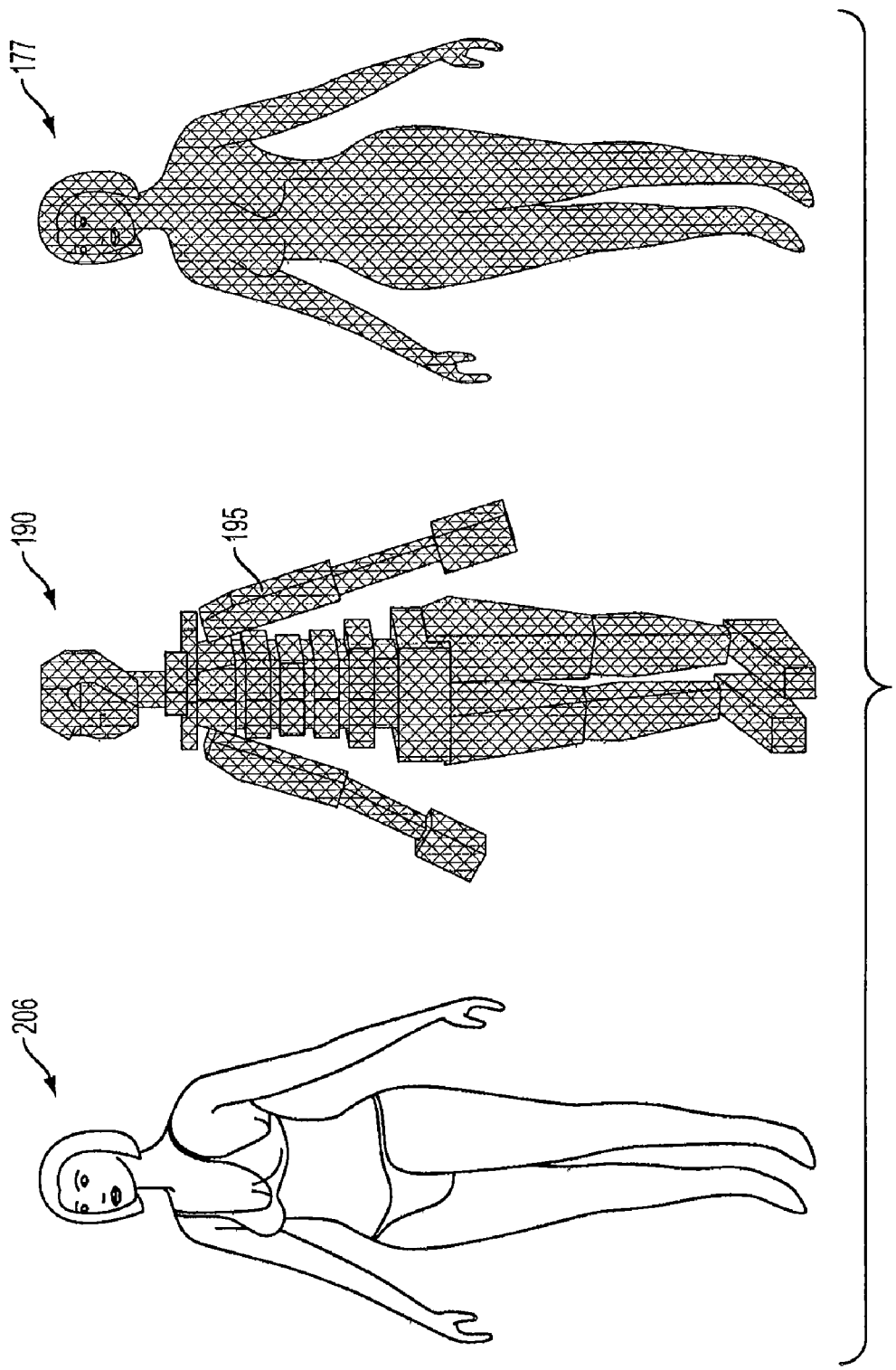
FIG. 8 is a side perspective view illustrating one example of the actual appearance of an intended wearer, the theoretical model applicable to such wearer, and the model generated for such wearer by one embodiment of the clothing design system.

Referring to FIGS. 7 and 8, the modeling module 30, in one embodiment, includes a vector graphics system or a vector modeling system which enables the server 12 to generate a three-dimensional model of the intended wearer. This model of the wearer will, at times, be referred to herein as the generated model 177. In this type of system, a vector data is used to represent discrete features that are defined as points, lines and polygons. In one embodiment, the vector data represents these features as pairs or sets of X, Y, and Z coordinates, and each coordinate set specifies an element, as described below. Each element can be described by a mathematical matrix. Accordingly, the surface of a person's body can be described by a layer of matrices, and a garment can be described by another layer of matrices. As such, the vector-based modeling module 30 can enable the server 12 to generate a model of a person wearing a garment through the use of multi-layered matrices.

In one embodiment, this vector-based modeling module 30 includes: (a) a scalar data module 178 which enables the server 12 to manage and process the scalar data received by the user through use of the wearer characteristic input module 28; (b) an error response module 179 which enables the server 12 to detect whether any portion of the wearer characteristic input data does not meet designated criteria and replace the detected characteristic input data with designated data corresponding to an industry standard; (c) a theoretical or pre-stored model module 180 which enables the server 12 to access a plurality of data sets stored in the database 14 which are associated with different, predetermined, generic or theoretical body models; (d) an interpolation module 182 which enables the server 12 to interpolate a plurality of data points, data coordinates or data values based upon the data associated with the pre-stored models and the data input by the user through use of the wearer characteristic input module 28; (e) a three-dimensional image rendering module 184 which enables the server 12 to convert or transform the vector data into bitmap or pixel data which is displayable by the display device of the computer 18; and (f) an animation module 186 which enables the server 12 to animate the generated model 177.

In the example illustrated in FIG. 7, the pre-stored model module 180 enables the server 12 to access and process a data set associated with a theoretical male model 188, and the pre-stored model module 180 enables the server 12 to access and process a data set associated with a theoretical female model 190. These data sets are stored within the database 14.

The theoretical models 188 and 190 include a plurality of elements 192 and 194, respectively. Each such element is associated with a plurality of coordinate points or coordinate values, such as an X coordinate value, a Y coordinate value and a Z coordinate value. These elements 195 define a meshwork which is the basis for the body surface of the theoretical models 188 and 190. The generic or theoretical data used to create these models 188 and 190 can be derived from a plurality of sources, including, without limitation: (a) ASTM International; and (b) survey or response data collected or derived through questions, forms or surveys presented to one or more populations, people, organizations or other entities. It should be appreciated that the pre-stored model module 180 can include data sets associated with an array of theoretical models, such as a model associated with individuals of different ages or different ranges of height, body weight, size or skeletal structure.

In the example illustrated in FIG. 8, each element 195 has a designated triangular shape. It should be appreciated, however, that any suitable shape can be used, including, without limitation, triangular, square, rectangular or any suitable polygon or geometry.

Referring back to FIG. 7, the interpolation module 182 includes a plurality of interpolation algorithms usable by the server 12 to interpolate data points or data values based on the measurement data input by the user and the data sets associated with the theoretical models. As a result, the interpolation module 182 enables the server 12 to produce a customized male model 198 which would represent the generated model if the wearer were a male, and the interpolation module 182 enables the server 12 to produce a customized female model 200 which would represent the generated model if the wearer were a female, such as the generated model 177 illustrated in FIGS. 1 and 8.

As illustrated in FIG. 7, the interpolation module 182 makes certain changes or modifications to the elements of the theoretical models. These modifications are based on a set of designated interpolation algorithms. The interpolation algorithms enable the server 12 to transform elements 192 and elements 202 to correspond to the unique body characteristics input by the user. As illustrated in FIG. 7, the $Y_2$, $X_4$, $X_2$, and $Z_3$ values of the transformed elements 202 indicate that the server 12 has modified, estimated or interpolated certain coordinate values to generate the customized male model 199. Likewise, the $X_4$, $Y_3$, $X_2$ and two $Z_2$ values of the transformed elements 204 indicate that the server 12 has modified, estimated or interpolated certain coordinate values to generate the customized female model 201.

In operation of one example, the intended wearer is a female with the actual appearance 206 illustrated in FIG. 8. It should be understood that the actual appearance 206 is shown in FIG. 8 only for purposes of describing the modeling function of system 10. The clothing design system 10 can perform all of the functions described herein without requiring any photos or scanning of the intended wearer.

Continuing with this example, the system 10 retrieves the data set associated with the theoretical female model 190 for modeling purposes. Using the wearer characteristic data input by the user, the interpolation module 182 causes the server 12 to perform an interpolation process which results in the generated model 177 illustrated in FIGS. 1 and 8.

In one embodiment, the interpolation module 182 creates or generates new data points which have not been provided by the user and which were not already part of the theoretical models 188 and 190. For example, to model an intended wearer's forearm, the interpolation module 182 may only require the user to input the length of the forearm and the circumference of the forearm at the forearm's largest section. The interpolation algorithms receive these two data points from the user. Next, the interpolation algorithms may: (a) add, for example, one hundred data points to the forearm of the theoretical model 188 or 190; and (b) modify for example, twenty of the preexisting data points of the theoretical model 188 or 190. This results in a model of the intended wearer's forearm which corresponds to the actual shape and size without requiring the user to input relatively large amounts of data.

In one embodiment, the database 14 stores a plurality of vector data sets associated with a plurality of different types, styles and sizes of garments. Accordingly, both the selected garment and the generated model 177 are vector-based. As such, the interface module 196 enables the computer 18 to display the garment piece images 27 on the generated model 177. In particular, the interface module 196 enables the server 12 to mathematically and graphically interface the garment piece images 27 with the generated model 177.

The interface module 196, in one embodiment, includes a collision module 208. The collision module 208 enables the server 12 to mathematically and graphically attach the garment piece images 27 to designated attachment points of the generated model 177. In addition, the collision module 208 is coupled to the fitting module 32, described below. Based on the user's ease and fit inputs, the collision module 208 enables the server 12 to adjust the spatial relationship between the garment piece images 27 and the generated model 177.

In one embodiment, each attachment point of the generated model 177 functions as an anchor or coupling point for the draping of a fabric piece on the model 177 to produce a suitable pattern. The system 10 enables the server 12 to produce a simulation of the draping process. The interface module 196 enables the user to graphically move and manipulate such graphical fabric piece while it remains anchored or coupled to a designated attachment point of the model 177. Once the user achieves the desired position and geometric configuration of the fabric piece, the system 10 enables the server 12 to automatically convert the draped fabric piece to a pattern. The pattern is then displayed in the pattern layout center 110.

Figure 9:
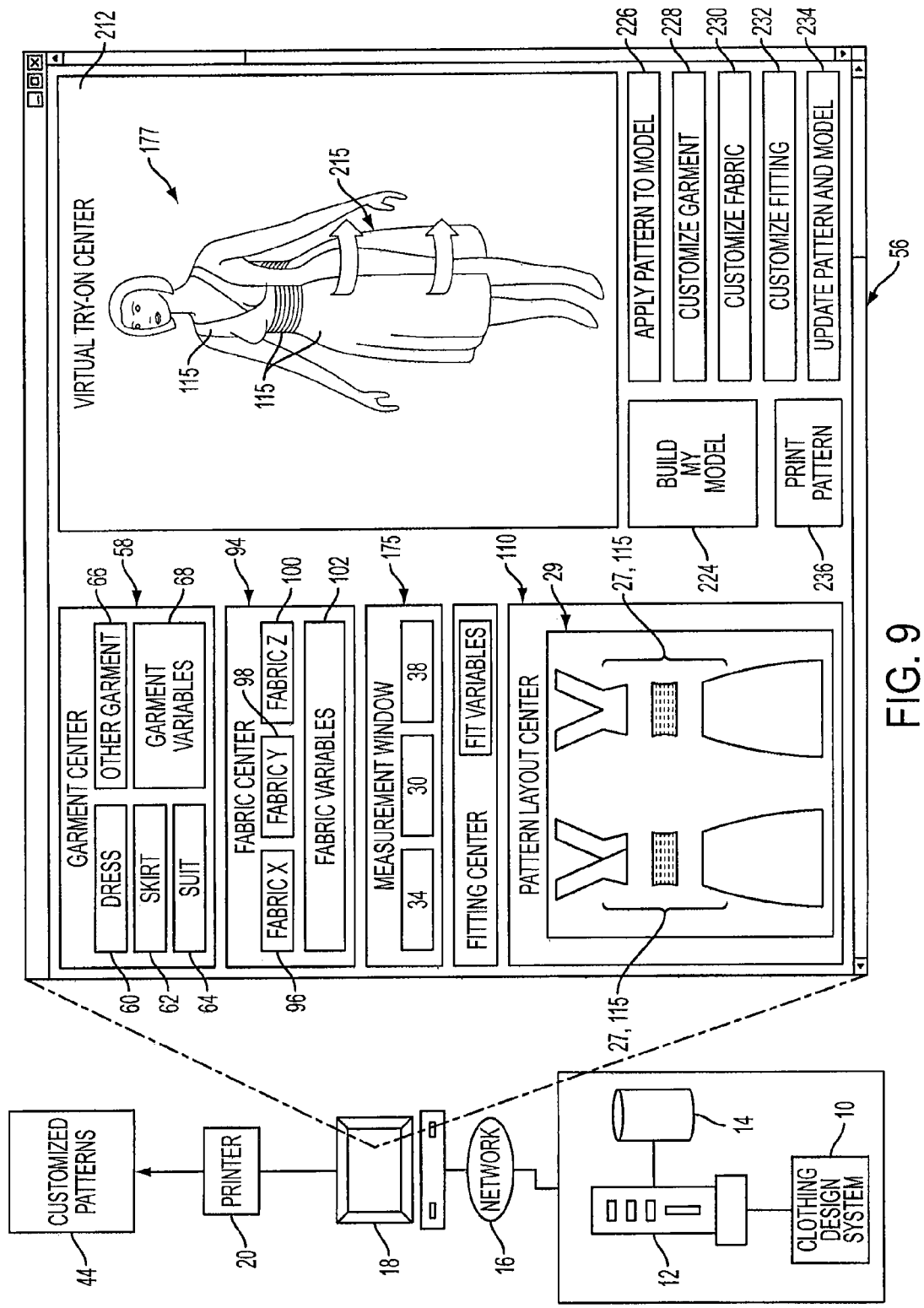
FIG. 9 is a top plan view of a graphical user interface of one embodiment of the clothing design system, illustrating the pattern-shaped garment pieces being dynamically wrapped around the generated model.

Referring back to FIG. 7, the animation module 186 is used by the server 12 to generate a video or any other suitable animation of the generated model 177. In one embodiment, the animation module 186 enables the server 12 to simulate the wrapping of the garment piece images 27 around the generated model 177. In another embodiment, the animation module 186 enables the server 12 to cause the generated model 177 to change stances, move his or her arms or have other body motion while the garment piece images 27 are being worn on the generated model 177. In the example illustrated in FIG. 9, the server 12, under control of the animation module 186, is simulating the garment piece images 27 being wrapped around the generated model 177. In one embodiment, the modeling module 30 enables the user to rotate the generated model 177 through three hundred sixty degrees so the user can view the front, sides and back of the model, and the modeling module 30 also enables the user to view the generated model 177 from a plurality of different viewing angles.

Figure 11:
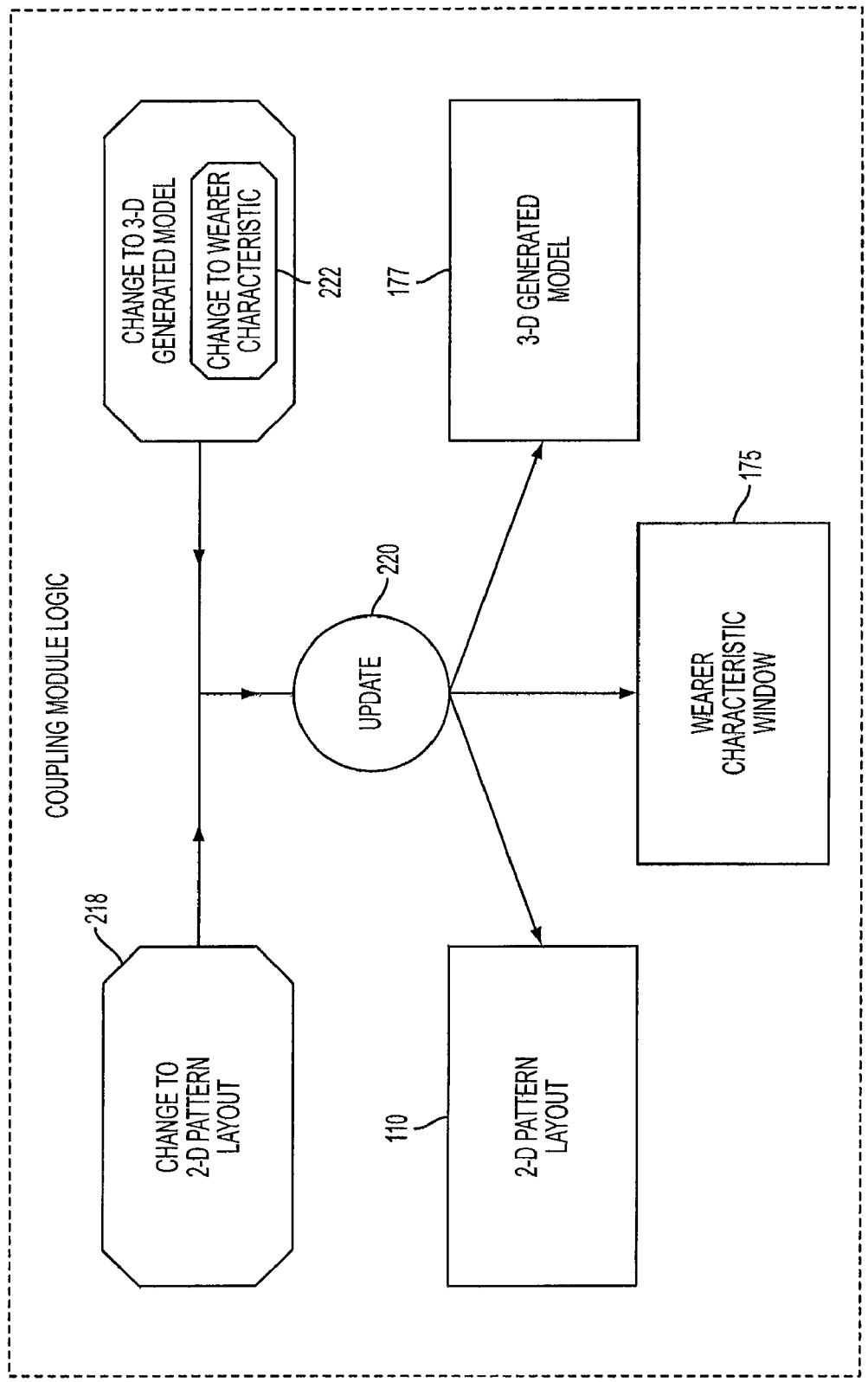
FIG. 11 is a diagrammatic flow diagram illustrating the update operation of the coupling module of one embodiment of the clothing design system.

Referring to FIGS. 1, 10 and 11, the linkage or coupling module 34 links the changes made in the virtual try-on center 212 to the changes made in the pattern layout center 110 and the characteristic window 175. In the example illustrated the user initially selected the sleeveless dress 214 illustrated in FIG. 1, and the user initially input measurements of thirty-four inches, thirty inches and thirty-eight inches corresponding to bust, waist and hip measurements, respectively. Next, the user customized the sleeveless dress 214 by adding shoulder pieces 215, and the user also updated the bust, waist and hip measurements to thirty-five inches, thirty-one inches and thirty-nine inches, respectively. This resulted in the sleeved dress 216 illustrated in FIG. 10, and this also resulted in the updated measurements shown in the characteristic window 175. After the user made the measurement changes and added the shoulder pieces 215 to the generated model 177, the coupling module 34 caused the shoulder pieces 215 to automatically appear in the pattern layout center 110. At the same time, the coupling module 34 updated the measurements in the characteristic window 175. In addition, the coupling module 34, in conjunction with the layout module 24, caused the server 12 to automatically update the pattern dimensions based on the measurement changes and shoulder piece additions. It should be appreciated that the same type of process can operate in reverse order. For example, if the user adds shoulder pieces 215 to the pattern layout center 110, the coupling module 34 can cause the server 12 to automatically update the generated model 177 with the newly added shoulder pieces 215.

It should also be appreciated that the coupling module 34 can cause the pattern layout center 110 and characteristic window 175 to automatically reflect any suitable change made in the virtual try-on center 212. Likewise, the coupling module 34 can cause the virtual try-on center 212 to automatically reflect any suitable change made in the pattern layout center 110. In one embodiment, for example, if the user changes a body characteristic, such as the dimension of the waist girth 136, the clothing design system 10 can automatically update the characteristic window 175 and the generated model 177, including the size and shape of the garment pieces 115 worn on the generated model 177. In addition, the clothing design system 10 can automatically update the pattern layout center 110 to indicate the change in the dimension of the pattern pieces to reflect the changes in the waist girth measurement.

As illustrated in FIG. 11, the linkage or coupling module 34 facilitates the iterative clothing design process by enabling the user to visualize interactive changes in a virtual try-on environment, while automatically transmitting those changes to the pattern layout and the characteristic window. In operation of one example, the user makes a change to the two-dimensional pattern layout 110, as indicated by step 218. As indicated by update step 220, the server 12 uses the coupling module 34 to automatically and simultaneously update the two-dimensional pattern layout 110, the three-dimensional generated model 177 and the garment worn on the generated model. After that, the user changes the hip measurement for the three-dimensional generated model 177, as indicated by step 222. As indicated by update step 220, the server 12 uses the coupling module 34 to automatically and simultaneously update the two-dimensional pattern layout 110, the three-dimensional generated model 177, the garment worn on the generated model and the wearer characteristic window 175.

Depending upon the type of change made, the coupling module 34 can trigger an automatic dual update of the pattern layout 110 and generated model 177, or the coupling module 43 can trigger an automatic tri-update of the characteristic window 175, pattern layout 110 and generated model 177. In one embodiment, the coupling module 34 includes a plurality of designated coupling algorithms which enable the server 12 to perform the update step 220.

As described above, the fitting module 32 of the clothing design system 10 generally enables the user to adjust a plurality of ease and fit settings while the selected garment is shown worn on the generated model 177. These ease and fit settings, which are pre-stored in the database 14, can include, without limitation, a drape variable, a looseness variable, a tightness variable and any other suitable fit variable.

As described above, the archive module 36 of the clothing design system 10 enables the user to store information in the database 14 for later use. This information can include patterns that the user has set-up, garment types designed by the user, fabric settings that the user has established, a plurality of generated models built by the user, online account information and other suitable files and information. In one embodiment, the archive module 36 can be used in conjunction with the coupling module 34 and any of the other modules of the system 10 to store information in the database 14 on a per project basis. Such archived information can include a set of user-provided comments corresponding to each project. For example, the archive module 36 enables the user to enter information related to the outcome of a garment project. The information can be positive or negative, and it can include notes, suggestions and learnings which may be useful for future garment projects. In one embodiment, the archive module 36 includes a project creation input or link. The user activates such input to create a new project library or archive for a new garment project. In time, a single user can have a plurality of project archives or projects, each of which stores valuable user-provided information. In this regard, the user can create an archived library of project comments.

The preference setting module 40 of the clothing design system 10 enables the user to set and control a plurality of operating parameters for the system 10. In one embodiment, the preference setting module 40 enables the user to set the user's preferences relating to the clothing design or garment design process. Such preferences can include, without limitation, personal profile settings for the generated model, such as hair color, sex or skin tone. In addition, the preference setting module 40 enables the user to set a plurality of system preferences including, without limitation, font type, display settings, sound settings, color scheme settings and other configurable parameters.

The printing module 42 of the clothing design system 10 enables the server 12 to cause the printer 20 to print customized patterns 34 using a standard printer driver or any other suitable printer driver. In one embodiment, the printer module 42 includes a print preview module which enables the user to preview the patterns 44 as laid out on printing paper before actually printing the patterns 44. The printing module 42 also enables the user to select the paper size and type from a plurality of paper settings, including, without limitation, eight and one-half inch by eleven inch sized paper or A4 sized paper sized paper, each of which is suitable for personal computer printers. The paper settings can also enable the user to print patterns 44 on larger paper suitable for commercial-based or industrial-based pattern printing systems. In either case, the print preview function of the printing module 42 enables the user to position the patterns on one or more sheet images so as to minimize or reduce the amount of paper necessary to print a customized pattern 44. In addition, the printing module 42 includes a plotting tool which facilitates the plotting of the pattern images on the paper.

Referring back to FIG. 1, the clothing design system 10, in one embodiment, provides the user with access to a database and a graphical user interface which enables the user to: (a) select the desired garment to be made; (b) select the desired fabric for the garment; (c) lay the pattern over the fabric on a virtual table 110; (d) activate the build-my-model input 224 to build a three-dimensional generated model 177 of the intended wearer based upon body characteristics entered by the user using a keyboard, touch screen or other suitable input device; (e) apply the pattern to the generated model 177 by activating the apply input 226, resulting in a simulation of the patterned garment being wrapped around the generated model 177; (f) activate the customize garment input 228 to make adjustments to the garment or body size or shape of the generated model 177; (g) activate the customize fabric input 230 to make adjustments to the fabric type of fabric; (h) activate the customize fitting input 232 to make adjustments to ease and fit variables of the garment worn on the generated model 177; (i) activate the update input 234 to view an update of the pattern layout and measurement window which the server 12 automatically generates based upon changes made in the virtual try-on center 212; and (j) activate the print pattern input 236 to print the customized patterns 44 necessary to make the garment as viewed on the three-dimensional generated model 177. This type of system provides users with enhanced convenience, efficiency and customization in designing garments and generating garment patterns.

In one alternative embodiment, the structure and functionality of system 10 is applicable to the design of upholstery for furniture (such as slip covers), window treatments (such as drapes), accessories (such as pillows), home decoration items and other fabric devices or fabric items which are designable through the use of templates or patterns. The term fabric item, as used below, will be a general reference to any one of these types of pattern-based fabric devices or items. In this embodiment, the pattern-based design system includes the structure, components and functionality of the clothing design system 10 described above, except that: (a) the garment is replaced with the particular fabric item being designed (such as a slip cover for a sofa); (b) the garment module 22 is replaced with a fabric item module (such as a slip cover module); (c) the generated model 177 is a generated model of the structure (such as a sofa) which will support a corresponding fabric item; (d) the wearer characteristic input module 28 is operable to receive characteristics (such as, sofa height, width and depth) associated with the structure that will carry the fabric item; and (e) the modeling module 30 is operable to enable the server 12 to generate a three dimensional graphical model of such structure based upon: (i) pre-stored data associated with such type of structure; and (ii) the measurement and characteristic inputs provided by the user.

Figure 2:
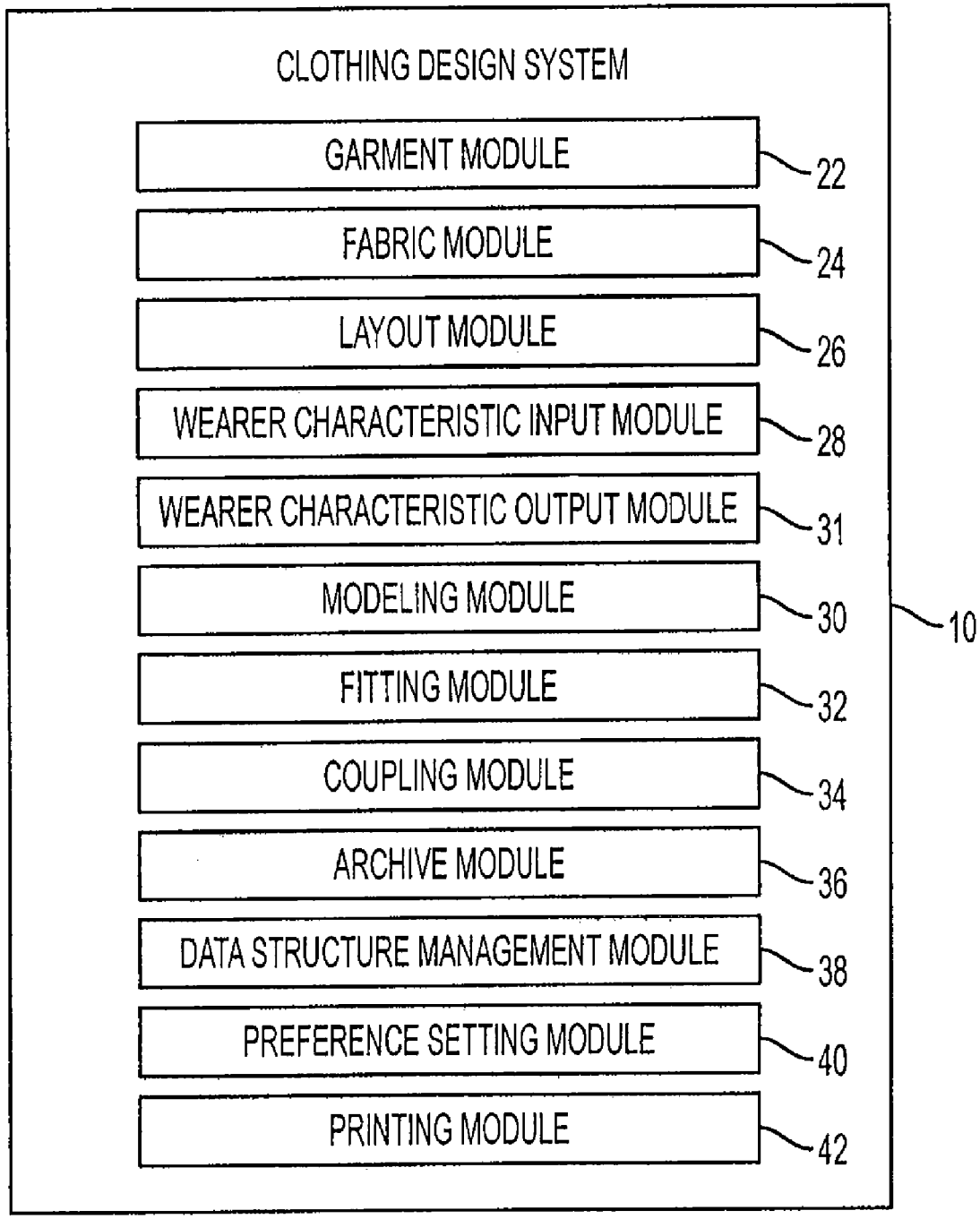
FIG. 2 is a schematic block diagram illustrating the modules of one embodiment of the clothing design system.

Referring to FIGS. 1 and 2, in one example, the trim module 23 enables the user to select the desired trim 301 by type. Then, on the main graphical interface 56, the user can select a pattern from the pattern layout center 110 to which the selected trim 301 will be added. With the trim module 23 being coupled to the layout module 26, the system 10 enables the user to provide inputs specifying the arrangement or configuration in which the trim will be added to the pattern (i.e., horizontally, vertically, in a single row, in multiple rows, etc.). First, the user specifies a location for the selected trim 301 on the pattern. In the example illustrated in FIG. 1, the trim 301 is displayed as a trim image 303 in the pattern layout center 110. In the illustrated example, the use located the wavy-shaped trim 301 at the bottom of the pattern image assembly 115. It should be appreciated that, depending upon the embodiment, the system 10 can enable the user to specify the location of the trim 303 by entering coordinate data or by graphically dragging the trim 301 over the image assembly 115. The trim module 23 then causes the server 12 to calculate the required size (including length and/or width) of trim 301 based on the positioning and arrangement of trim 301 on the pattern or model 177. In this regard, the system 10 automatically generates an accurate measurement of the amount and size of trim needed for select patterns.

With reference to FIGS. 1 and 3 and also to FIG. 4, in one embodiment, the garment module 22 and the fabric module 24 are coupled to the coupling module 34. This enables the system 10 to automatically, graphically indicate the user's fabric module inputs and/or garment module inputs in the pattern layout center 110. Accordingly, when the user specifies: (a) a particular type of trim; and (b) a desired location for such trim, the system 10 automatically determines the size for the selected trim and automatically displays the properly sized trim at the specified location within the pattern layout center 110. The system 10 also automatically updates the model 177 to include the image of the selected trim.

Garment information from the garment module 22 and fabric information from the fabric module 24 can be stored in the database 14 as stash inventory information. The coupling module 34 can include one or more algorithms usable by the server 12 which correspond to such stash inventory information. For example, in an embodiment, the coupling module 34 includes an algorithm to select components 56 from the garment module 22 which are compatible with, and based on, fabric module input from the user. For instance, if the user selects a delicate fabric such as silk, the coupling algorithm will output a list of components 56 which are stylistically compatible with the selected silk. The components 56 in the stash inventory can be preconfigured to correlate with the types of fabric in the stash inventory database 14. The resulting component-fabric combinations can be stored in the database 14. In one example, the coupling module 34 includes a plurality of matching algorithms which facilitate the matching of garment parameters A with garment parameters B. For example, a matching algorithm X-A can receive a user's specification of a fabric color X and output a plurality of buttons A which are stylistically or visually compatible with the fabric color X. Likewise, algorithm Y-B can receive a user's specification of a pin-stripe design Y for a garment and output a plurality of zippers or other components 56 which are stylistically or visually compatible with the pin-stripe design Y. Depending upon the embodiment, the components 56 can include supplemental pieces 50, accessories 52, trim 55 or any suitable combination thereof.

In another embodiment, the coupling module 34 includes a matching algorithm to select a plurality of fabrics from the stash inventory information based on the pattern image 27 and a plurality of fabric images 29. For instance, if the user selects a pattern image 27 from the pattern layout center 110 that includes a top piece of a first fabric (i.e., bodice) adjoining a bottom piece of a second fabric (i.e., skirt), and if the user selects a primary fabric image 29 (e.g., black fabric with white polka dots), then the matching algorithm will provide the user with a plurality of secondary fabric images 29 from which to choose. Such secondary fabric images 29 are complimentary to the selected primary fabric image 29 (e.g., solid black or white fabric). Fabrics in the stash inventory can be preconfigured to correlate with other fabrics such that resulting multi-fabric combinations are stored in the database 14. In this regard, the system 10 assists the user in selecting a plurality of complimentary fabrics and components for a single garment.

In one embodiment, the system 10 includes a matching search module. The matching search module enable the user to input one of a plurality of search parameters, such as color, softness, material type, or design. For example, if the user inputs beige for a fabric color, the search results include a variety of different types of buttons and zippers which match with beige.

Figure 12:
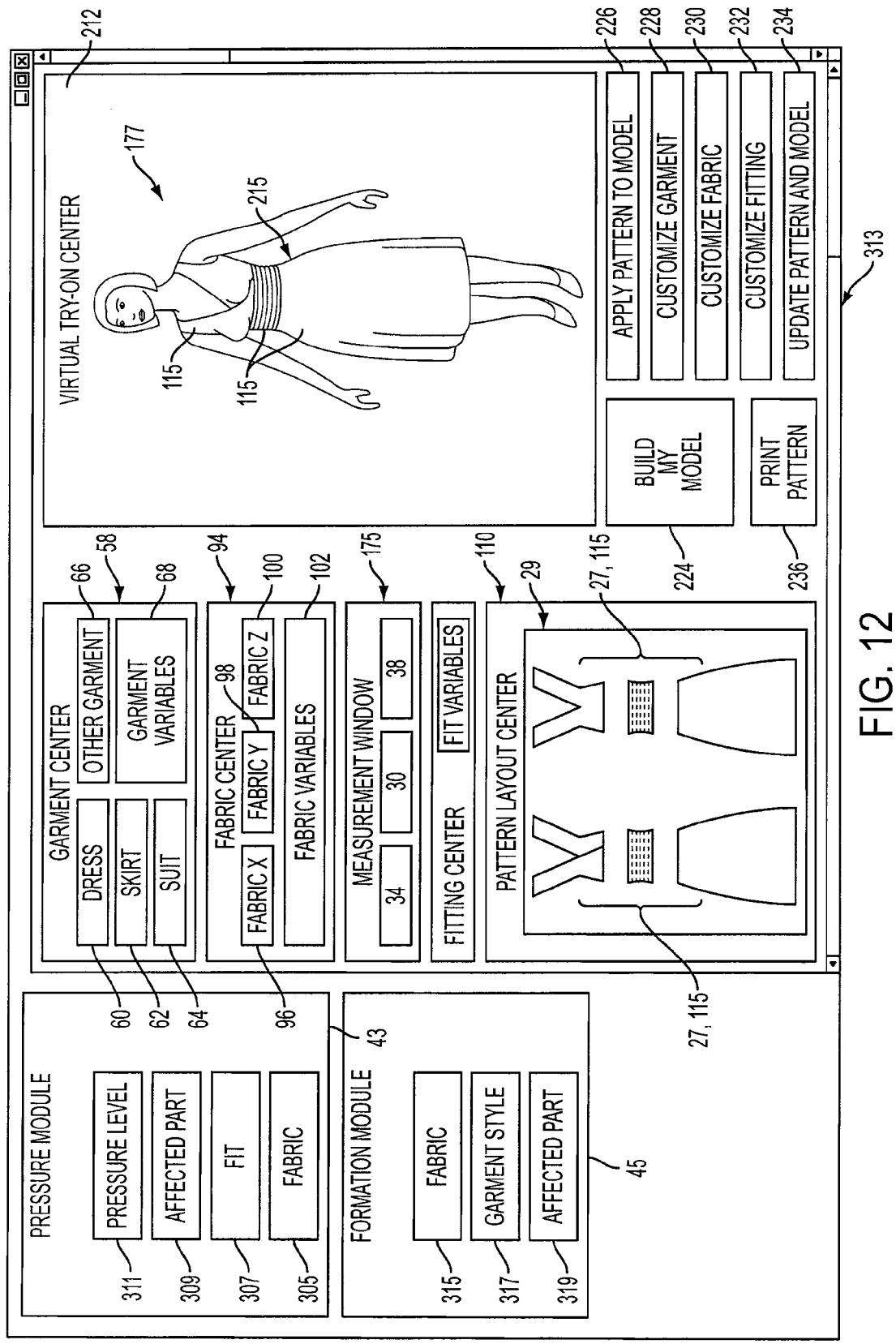
FIG. 12 is a top plan view of a graphical user interface of one embodiment of the clothing design system, illustrating an example in which the pressure module and the formation module are used to automatically update the garment worn on the generated model.

In one embodiment illustrated in FIG. 12, the system 10 includes a pressure module 43. The pressure module 43 enables a user to analyze and adjust pressures applied by a garment to various locations on the intended wearer's body. The pressure module 43 can work in conjunction with the coupling module 34, fabric module 24, fitting module 32, modeling module 30 and any other above-described module to determine pressures assigned to a moving part of the intended wearer's body. For example, the pressure module 43 is operable to receive user input through: (i) the fabric module 24 related to the type of fabric 305 (e.g. cotton) for a garment, or (ii) the fitting module 32 related to a desired fit level 307 (i.e., loose, moderately loose, normal, moderately tight and tight). The pressure module 43 also receives user input related to at least one anatomical part 309 of the intended wearer's body to which the pressure is applied (e.g., thighs). Also, the pressure module 43 enables the user to input a desired pressure level from a set of levels 311, such as low, medium and high, or a range of pounds per square inch. For example, the user may use the pressure module 43 to specify a long column skirt, a moderately tight fit, cotton material, and thigh pressure analysis. In such example, the pressure module 43 is operable to indicate the look, feel, pressure, and anatomical effect of such skirt on the thighs. The information output by the pressure module 43 enables the user to assess whether the skirt will strain or hinder the wearer's movement.

The pressure module 43, in one embodiment, is operable (through one or more algorithms) to provide a plurality of visual indicators representing various degrees of pressures associated with body parts of the three-dimensional graphical model 177, as shown in the graphical user interface 305 in FIG. 12. In an embodiment, the visual indicators can include color indicators. For example, a low pressure on the intended wearer's lower back can be represented on the graphical model 177 by the color blue while a high pressure on the intended wearer's right shoulder can be represented on the graphical model 177 by the color red. In another embodiment, the visual indicators can include hash marks or any other suitable visual or audio visual methods to indicate varying degrees of pressure. In this regard, various pressure levels are distinguishable within the virtual try-on center of the graphical user interface 56. Consequently, the pressure module 43 enables the user to make changes to the garment on the graphical model 177 based on the pressure levels which would be felt by the intended wearer of the pattern-based garment.

In one embodiment illustrated in FIG. 12, the system 10 includes a formation module 45. The formation module 45 enables a user to customize a formation garment in order for the garment to cause a given pressure on a designated body part of the intended wearer. The garment exerts a pressure on a part of the intended wearer's body for medical, therapeutic, rehabilitative, cosmetic, or athletic purposes. For example, a user may wish to create a custom pair of shorts for a basketball player with a swollen leg. In another example, a user may create a girdle for a woman having physical attributes pre-defined by the wearer characteristic modules 28 and 31. In this regard, a garment can be created for an intended wearer to reform, reshape, or support the soft tissues lying beneath the garment.

In using the formation module 45, a user first drapes the formation garment using the graphical user interface 313 discussed above. Next, a desired pressure level is set. In an embodiment, the formation module 45 directly receives a user input related to a desired level of pressure. In another embodiment, the formation module 45 works in conjunction with the pressure module 43 and/or any other above-described module to receive the input related to a desired pressure level or magnitude. The formation module 45 includes one or more algorithms usable by the server 12 to analyze desired pressure levels and to determine what size a garment should be to produce such pressure on the specified body part of the wearer. Then, the user can alter the formation garment, while it is displayed on the model 177, by making changes to the formation garment on the graphical model 177.

In one example illustrated in FIG. 12, the formation module 45 enables the user to select: (a) a fabric type 315 (for example, spandex); (b) a garment style 317 (for example, back brace, t-shirt, wrist support or under garment); and (c) the affected or treated body part 319 (for example, lower back, abdomen, wrist or thighs). By activating one or more inputs using the interface 313, the system 10 enables the user to display the selected garment of the selected fabric on the selected body part 319. Through one or more inputs, the formation module 45 enables the user to adjust the pressure applied by the formation garment while the customized model 177 displays a formation change in response to the applied pressure. This enables the user to see or preview how garments of varying sizes, shapes and characteristics will affect soft tissue formation of an intended wearer.

In one embodiment, the formation module 45 enables the user to cause a graphical movement of one or more body parts or positions of the model 177. For example, the formation module enables the user to bend over as if touching his or her toes. In such example, the soft tissue under a back brace garment can change its shape enabling the user to visualize and consider the effects of the back brace garment. Also, in one embodiment, the formation module dynamically changes the pressure level indication for the designated body part during simulated movement of the model 177. For example, when the model 177 bends over, the color of a back brace garment can change form blue to green to indicate an increase in pressure level. Accordingly, the formation module 45 enables users to design pattern-based garments while taking into consideration a previewing of pressure, stress and strain applied or received by garments with respect to soft tissue areas of the body of the intended wearer.

Figure 13:
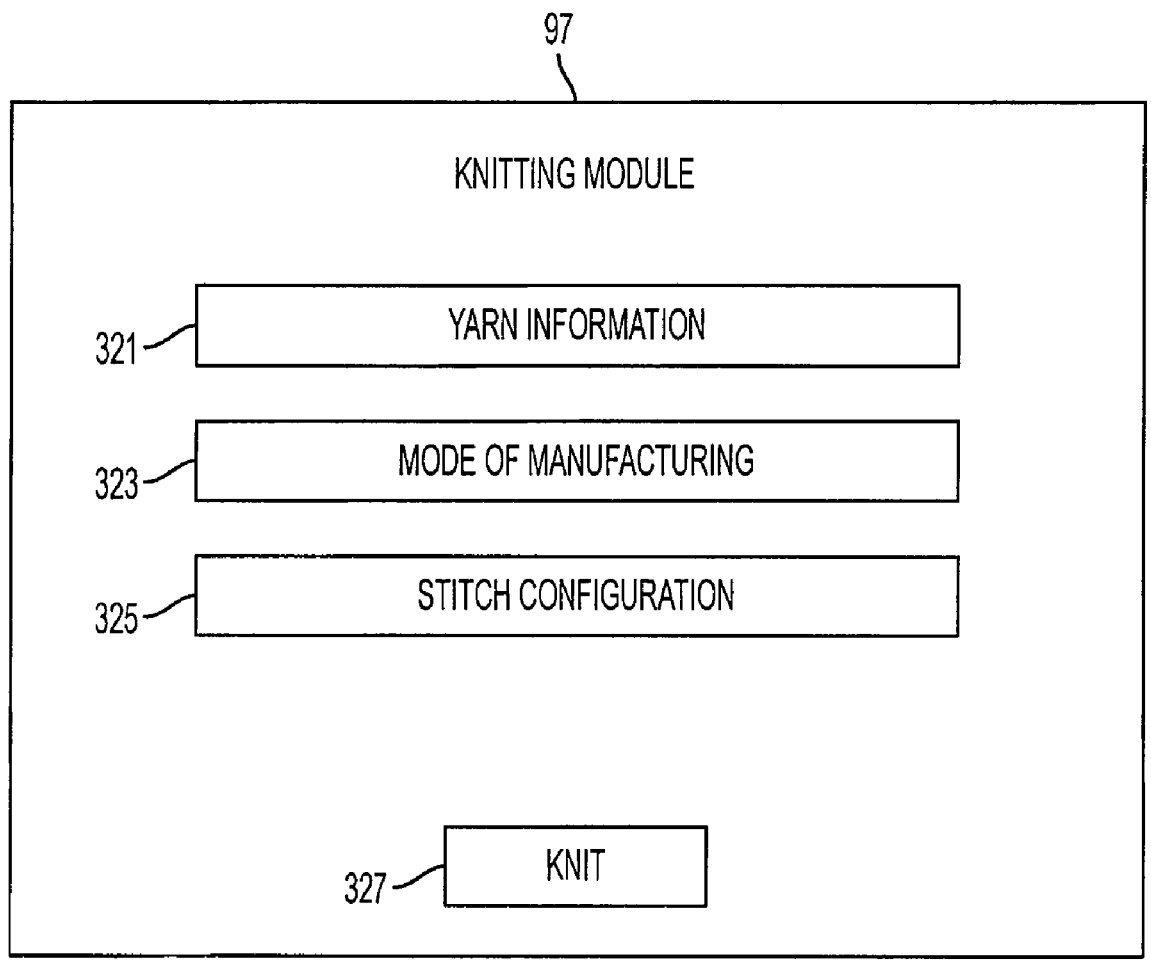
FIG. 13 is a top plan view of a graphical user interface of one embodiment of the clothing design system, illustrating a knitting module input screen.

In reference to FIG. 13, in one embodiment, the system 10 includes a knitting module 47. The knitting module 47 is operable to enable a user to translate a pattern or a garment image into knitting specifications, directions or knitting instructions which are usable to fabricate a garment. The following table sets forth example knitting instructions which are producible by the knitting module 47:

| Scarf Knitting Instructions | Vest Knitting Instructions |
|---|---|
| (#1) use U.S. 15 needles, cast on 14 sts | (#1) Gauge: 11 sts and 17 rows to 4"/ 10 cm over St st using 13 needles and |
| (#2) row 1: knit across | |
| (#3) row 2: purl across | double strand of yarn. |

-continued

| Scarf Knitting Instructions | Vest Knitting Instructions |
|---|---|
| (#4) repeat rows 1 and 2 for a total of 50 rows (or until you almost run out of yarn)<br>(#5) bind off<br>(#6) fold knitted piece in half lengthwise and tie the top corners together, do not sew seam.<br>(#7) slip over your head and leave the open section on one shoulder | (#2) Two strands of yarn are used at one time.<br>(#3) Back: With double strand of yarn, loosely cast on 55 (58, 60, 64, 66) sts.<br>(#4) Row 1 (RS) Purl.<br>(#5) Row 2 Knit.<br>(#6) Repeat these 2 rows 3 times more for reverse St st.<br>(#7) Next row (RS) Knit.<br>(#8) Next row Purl.<br>(#9) Rep these 2 rows for St. St for $13\frac{1}{2}$ ($13\frac{1}{2}$, 14, 14, $14\frac{1}{2}$)"/34 (34, 35.5, 35.5, 37) cm more OR 58 (58, 60, 60, 62).<br>(#10) Work in reverse St st for 8 rows.<br>(#11) Bind off all sts loosely.<br>(#12) Front: Work same as for back.<br>(#13) Finishing: Do not block.<br>(#14) Lay pieces flat and place markers at $9\frac{1}{2}$"/24 cm from lower edge on both sides of both pieces for underarms.<br>(#15) Sew side seams to markers.<br>(#16) Leaving center 13"/33 cm free for neck opening, place markers at $3\frac{1}{2}$ (4, $4\frac{1}{2}$, 5, $5\frac{1}{2}$)"/9 (10, 11.5, 12.5, 14) cm from each shoulder edge.<br>(#17) Sew shoulder seams up to markers. Lower and neck edges will roll naturally to inside. |

In operation, the user selects a pattern or garment using one or more of the above-described modules of the system 10. Then, the user clicks on a knit button or knit command input 327 of the knitting module 47. Upon activation of the knit input 327, the knitting module 47 causes the server 12 to translate or convert the selected pattern or garment image into knitting instructions. The knitting module 47 includes one or more algorithms usable by the server 12 to perform such translation or conversion. In one embodiment, such instructions are displayed to the user on the graphical user interface 56. In an embodiment, the knitting module 47 is configured to work in conjunction with the printing module 42 to enable the user to print: (a) the selected pattern or garment images; and (b) the knitting directions or instructions which specify the steps necessary to knit such desired garment.

In one embodiment, the knitting module 47 enables the user to provide direct input for the knitting instructions. For example, the module 47 enables the user to provide desire inputs or selections of various knitting parameters including, but not limited to, yarn information 321 (e.g., gauge, type of material, elasticity of material, etc.), mode of manufacturing 323 (e.g., machine knit or hand knit) and stitch configuration 325 (e.g., cable stitch, stockinet stitch, number of stitches per row, etc.). The server 12 then prints or produces the user-customized knitting instructions for the user.

Figure 14:
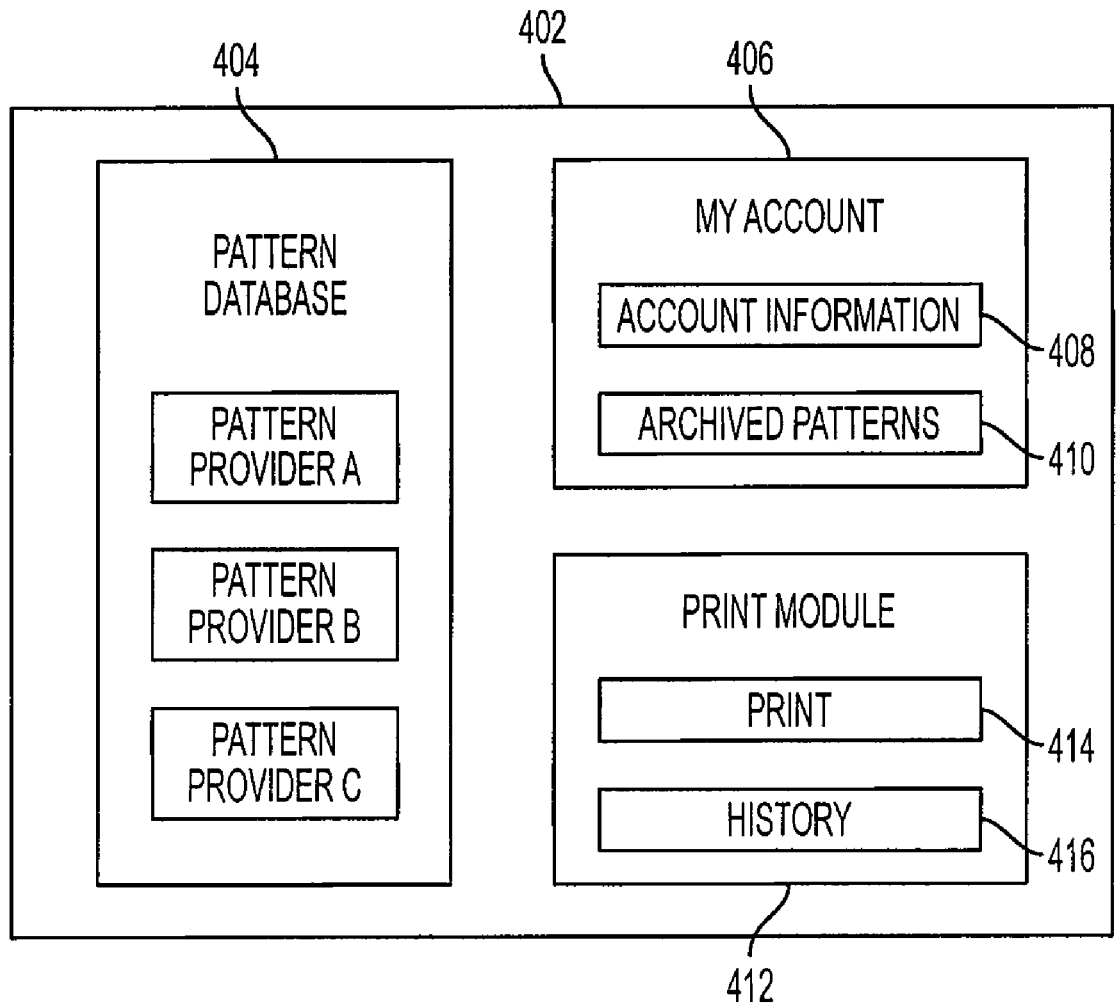
FIG. 14 is a top plan view of a graphical user interface of one embodiment of an account system for facilitating commercialization of a garment pattern.

The present disclosure further includes a method and system 402 for facilitating commercialization of a garment pattern. In one embodiment, such method includes electronically storing in a database 404, a plurality of pattern images provided by a pattern provider, such as an apparel manufacturer or clothing designer. The database 404 is coupled to the server 12 and system 10. For example, the pattern database 404 can include patterns of pattern provides A, B and C, as illustrated in FIG. 14. The method, in one embodiment, includes: (a) providing users with access to the pattern images over a network, such as the Internet; (b) enabling a user to select one or more of the pattern images; (c) displaying a graphical model of an intended wearer based, in part, on the user's inputs; (d) displaying a representation of the selected pattern image on the graphical model; (e) enabling the user to print the pattern corresponding to the displayed pattern image; (f) charging the user a fee for such printing; and (g) providing (or paying) a part of the fee to the pattern provider. In such embodiment, the implementer, operator or host of such system 402 operates the server 12 which, in turn, controls the system 402 in an online, Internet environment.

In one embodiment, each pattern provider enters into a pattern provider contract with the host. The pattern provider contract gives the applicable pattern provider with contractual rights to receive a portion (or royalty) of each fee the host receives from the user for the user's downloading or printing of each pattern and provider's pattern. Also, each user enters into a user contract with the host. The user contract requires the user to pay a fee to the host for each downloading or printing of each pattern.

In an embodiment, a customer or user accesses the pattern images over the internet using a web-based account module 406 of the system 10. The web account module 406 is coupled to the pattern database 404. In one embodiment, the web account module 406 requires the user to maintain a minimum monetary balance, a username, and a password to access the pattern database 404. In one embodiment, the account module 406 includes an account information submodule 408 which stores information relating to a designated user, including, but not limited to, name, address, account balance, billing preferences and other user-related information. In one embodiment, the web account module 406 is programmed to automatically provide a portion of the received fee to the pattern provider, as discussed above, for each printing of each desired pattern. In one embodiment, the web account module 406 enables the user to re-print the same pattern for no additional fees during a limited period, such as thirty minutes. In another embodiment, the web account module 406 includes a user archive 410 which enables the user to store and access pattern images, and print and re-print selected patterns over a pre-determined time period for a fixed fee. In another embodiment, the user has the option to purchase a license to use the software of the web account system for payment of a flat fee. The purchased software license enables the buyer to obtain access to, or to download, multiple pattern images or patterns from one or more pattern providers for an indefinite amount of time or for a fixed time period, such as one year. This software purchase option may be particularly useful when pattern providers have pattern image inventory that is not subject to significant changes, or for consumers in the garment design business. In one embodiment, the pattern commercialization system 402 includes a print module 412. The print module 412 includes: (a) a print activation or input 414 which enables the user to print the selected patterns; and (b) a print history submodule 416. The print history submodule 416 is executable by the server 12 to enable the user to access his/her history of printings of patterns.

It should be appreciated that the various module, elements, systems and embodiments described above are combinable or interchangeable in any workable fashion to result in another embodiment of the present disclosure.

It should be understood that various changes and modifications to the embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A data storage device comprising:
a plurality of computer-readable instructions associated with:
(a) processing garment data, the garment data associated with at least one garment piece having a shape which is specifiable in a plane by at least one pattern;
(b) displaying a first image, the first image illustrating the at least one pattern;
(c) receiving a plurality of first inputs, the first inputs being associated with a plurality of knitting parameters;
(d) displaying a second image the second image including:
(i) a graphical model of a possible wearer; and
(ii) a representation of the first image on the graphical model, the representation being based, at least in part, on the first inputs;
(e) receiving at least one second input, the second input being associated with a change to the representation;
(f) changing the at least one pattern in response to the second input; and
(g) providing output data, the output data including a plurality of knitting instructions associated with the at least one pattern.

2. The data storage device of claim 1, the knitting instructions including at least one specification selected from the group consisting of a needle size and a row specification.

3. The data storage device of claim 1, the graphical model having a three-dimensional appearance.

4. The data storage device of claim 3, the second image having a three-dimensional appearance when the second image is displayed worn on the graphical model.

5. The data storage device of claim 1, the first image having an image illustrating the at least one pattern.

6. The data storage device of claim 1, which includes a plurality of computer-readable instructions associated with processing a plurality of designated model data sets, each one of the designated model data sets representing a structure of a designated theoretical wearer.

7. The data storage device of claim 6, wherein one of the designated model data sets is associated with a male human, and another one of the designated model data sets is associated with a female human.

8. The data storage device of claim 7, wherein each one of the designated model data sets has vector data specifying a plurality of elements, each one of the elements having a plurality of designated coordinate points.

9. A system usable by at least one processor to facilitate garment design activities, the system comprising:
a garment module usable by the processor to process garment data associated with at least one garment piece having a shape which is specifiable in a plane by at least one pattern;
a wearer characteristic module usable by the processor to receive first input data, the first input data associated with anatomical information related to at least one anatomical part of a possible wearer;
a pressure module usable by the processor to:
(a) access data associated with a plurality of different degrees of pressures; and
(b) receive second input data, the second input data associated with at least one of the pressures assigned to the at least one anatomical part of a possible wearer;
a modeling module usable by the processor to display an image including:
(a) a graphical model of the at least one anatomical part, the graphical model being based, at least in part, on the first input data; and
(b) a representation of the garment data on the at least one anatomical part; and
a formation module usable by the processor to:
(a) change the representation based on the second input data; and
(b) indicate the degree of the at least one assigned pressure.

10. The system of claim 9, wherein the formation module includes at least one instructions which is usable by the processor to visually distinguish the different degrees of pressure.

11. The system of claim 9, wherein the formation module includes at least one instructions which is usable by the processor to visually indicate an affect of the assigned pressure on the anatomical part.

12. The system of claim 9, wherein the formation module includes at least one instructions which is usable by the processor to visually indicate a plurality of changing affects of the assigned pressure on the anatomical part during simulated movement of the anatomical part.

13. The system of claim 9, wherein the formation module includes at least one instructions which is usable by the processor to visually indicate a plurality of changing affects of the assigned pressure on the anatomical part based on a movement of the graphical model.

14. The system of claim 9, the graphical model having a three-dimensional appearance.

15. A method for facilitating commercialization of a garment pattern, the method comprising:
(a) storing garment data provided by a pattern provider, the garment data including a plurality of patterns, each pattern having a shape which is specifiable in a plane;
(b) providing access to the garment data over a network;
(c) enabling a network user to select at least one pattern;
(d) displaying an image, the image including:
(i) a graphical model of a possible wearer; and
(ii) a representation of the at least one pattern on the graphical model;

(e) enabling the network user to print a representation of the at least one pattern;

(f) charging the network user a fee for the printing; and (g) providing a part of the fee to the pattern provider.

16. The method of claim 15, wherein the graphical model has a three-dimensional appearance.

17. The method of claim 15, wherein the second image has a three-dimensional appearance when the second image is displayed worn on the graphical model.

18. The method of claim 15, which includes storing data associated with the printed representation.

19. The method of claim 15, which includes enabling the network user to access the stored data.

20. The method of claim 15, which includes maintaining an account for the network user, the account including a monetary balance.

* * * * *